US00RE34476E

United States Patent [19]

Norwood

[11] E Patent Number: Re. 34,476

[45] Reissued Date of Patent: Dec. 14, 1993

[54] HYBRID INFORMATION MANAGEMENT SYSTEM FOR HANDWRITING AND TEXT

[76] Inventor: Donald D. Norwood, P.O. Box 3525, Santa Clara, Calif. 95055

[21] Appl. No.: 889,664

[22] Filed: May 28, 1992

Related U.S. Patent Documents

Reissue of:

[64] Patent No.: 5,063,600
Issued: Nov. 5, 1991
Appl. No.: 523,230
Filed: May 14, 1990

[51] Int. Cl.[5] ..... G06K 9/00

[52] U.S. Cl. ..... 382/13; 364/705.03; 364/705.06; 345/173; 345/119

[58] Field of Search ..... 382/13, 3, 59, 61; 364/709.11, 705.02, 705.06; 340/712, 721, 723; 128/18, 19, 20

[56] References Cited

U.S. PATENT DOCUMENTS

| | | | |
|---|---|---|---|
| Re. 32,655 | 4/1988 | Levine | 368/29 |
| 4,727,588 | 2/1988 | Fox et al. | 382/13 |
| 4,815,029 | 3/1989 | Barker et al. | 364/900 |
| 4,817,034 | 3/1989 | Hardin, Sr. et al. | 364/900 |
| 4,912,640 | 3/1990 | Tsugei | 364/400 |
| 4,924,075 | 5/1990 | Tanaka | 235/380 |

OTHER PUBLICATIONS

Wang Laboratories Inc., various sales brochures: "Freestyle Personal Computing", Oct. 1988; The Wang Freestyle System, Oct. 1988; Wang Freestyle/LAN Office Interface, Apr. 1989.

Linus Technologies, sales brochures, technology paper: "Linus Write-Top", undated; Forms Write/Arrows, 1989; Handwritten Data into a Computer, Jun. 1989.

Grid Systems, sales brochures: "Introducing GridPad", 1989, Technical Specifications, 1989.

Toshiba America, sales brochure: "Toshiba Pen PC", 1989.

IBM, research report: "The Paperlike Interface", Feb. 3, 1989, Wolf, Rhyne and Ellozy.

*Primary Examiner*—Joseph Mancuso

[57] ABSTRACT

A computer system used with special input hardware for providing the benefits of computerization to handwritten as well as keyboard entered information to meet a wide spectrum of commonly-occurring, written information processing needs. The input hardware consists of a transparent digitizing tablet mounted atop a flat panel display screen such that a user can handwrite directly upon the display screen with an attached pen. Application program functions include appointment documentation and work scheduling, handwritten or text file creation and manipulation, author-to-typist liaison functions for document production, handwritten annotation to text, handwritten note creation from text, and text document creation from handwritten source material.

22 Claims, 17 Drawing Sheets

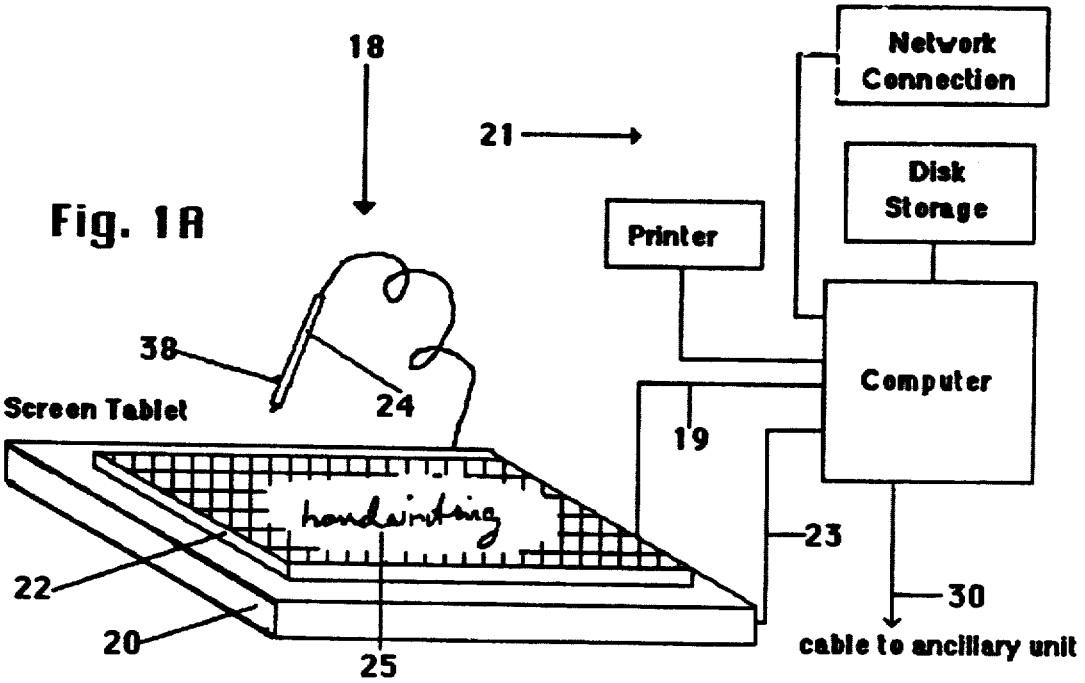
Fig. 1A
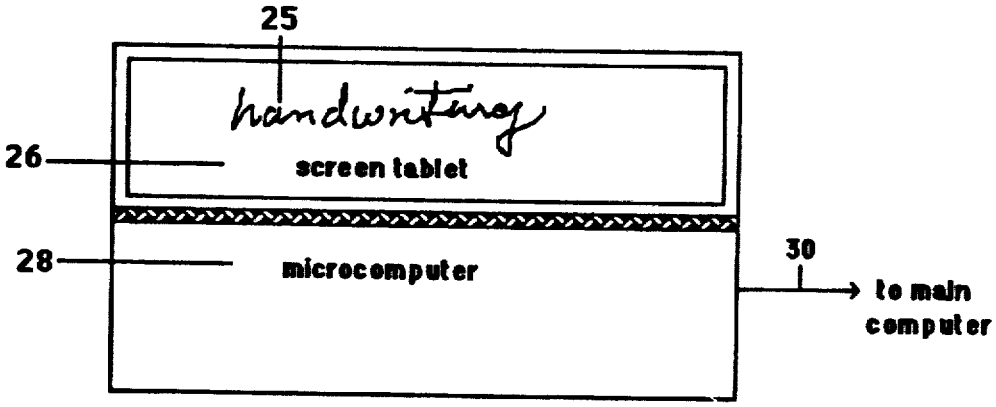
Fig. 1B portable ancillary unit

HYBRID INFORMATION MANAGEMENT SYSTEM FOR HANDWRITING AND TEXT

Matter enclosed in heavy brackets [ ] appears in the original patent but forms no part of this reissue specification; matter printed in italics indicates the additions made by reissue.

*This is a reissue of U.S. Pat. No. 5,063,600.*

BACKGROUND

1. Field of Invention

This invention relates to computers, specifically to a computer information system which accepts handwritten as well as keyboard input.

2. Description of Prior Art

Keyboard Interface—an Impediment to Greater Realization of Computer Benefits Personal computers possess the capability for storing, retrieving, and manipulating information more rapidly, accurately and efficiently than do corresponding manual methods. Yet despite their widespread implementation, with limited exceptions, their benefits have not significantly affected the bulk of the daily "mainstream" written information processing of most users.

The phrase "mainstream written information processing" is useful to describe written information processing associated with information items which occur frequently in the course of a normal day, and associated activities such as storage, retrieval, transmission, and manipulation. Thus, the mainstream written information commerce of a homemaker may be grocery lists, a list of things to do, reminders, miscellaneous notes, check writing and calendar annotations. That of a business employee may embrace a wide plurality of items, such as transmittals (memos) to others, messages, thoughts committed to a scratch pad, notes from meetings or telephone conversations, "to-do" lists, appointments, and a wide variety of materials to be typed by a secretary, such as letters, descriptions, reports, etc.

Significant gains in productivity have been achieved (1) with custom or specialized PC applications, and (2) in areas such as word processing, spreadsheet usage and desktop publishing. However, in comparison with the use of pencil and paper, the relative utilization of such applications among white-collar workers is relatively infrequent. Thus, a user may find a word processor to be the court of last resort when the secretary cannot type up an urgently needed communication, or use a spreadsheet program periodically for quarterly budget calculations. Even though there are a few high-frequency application areas, such as calendaring, for which PC software has been developed, in practice, users have generally resisted attempts to provide computerized assistance for the bulk of high-volume information commerce activities, such as those mentioned above. Thus, despite the large number of personal computers sold, little headway has been made in utilizing the computer to improve the efficiency of most user's mainstream everyday information processing. The truth of the observation that the potential computer benefits are not being realized for much of our daily business information processing is apparent, not only through close observation of business practice, but appears also to be borne out by economic statistics. It is widely accepted among contemporary economists that the productivity of white collar workers has not significantly increased over the past decade (1979-1989), despite the introduction into the business sector of the major portion of the 25 million or more personal computers which have been sold in the United States.

There would undoubtedly be many more computer users and more numerous applications targeted at common information processing tasks such as those mentioned above if a keyboard were not required to enter data. Many people don't know how to type effectively and, for any of a wide variety of reasons, don't want to learn. Typical examples include executives, housewives, older people, children and many professionals. The substantial learning requirement thus constitutes a significant drawback. In addition, the typical computer keyboard (known as the QWERTY keyboard) was purposely arranged by its inventors, Sholes et al, in an inefficient manner so as to purposely impede typing speed to prevent the crude keys of the time from jamming. The QWERTY keyboard itself thus deters novices from using it. While it is possible to type with one finger, users perceive little or no benefit from one-finger typing. Indeed, even proficient typists find that for many potential applications, such short notes, reminders, calendar annotations, expense record-keeping, personal data documentation or messages (i.e., items which constitute the bulk of their daily written information processing, the typing effort simply outweighs the advantages.

Even though typing can be faster than handwriting, the relatively precise positioning of the body, hands, and fingers required for typing frequently make it particularly inconvenient for short written work. Imagine the difficulty of trying to take typewritten notes while using a conventional telephone. Resistance toward computer usage among non-typists is further compounded by having to deal with a personal computer interface which, in the majority of cases, is characterized by novice users as "non-intuitive", "unfriendly", and "unnecessarily complex".

Another significant drawback to computer systems which do not admit handwritten data relates to the fact that their storage files generally may not contain handwritten data. Because most real-world business files contain some handwritten information, or at least handwritten annotations, a second set of manual storage files must be maintained. Significant potential benefits of computerization, such as instant, labor-less, retrieval and storage are thus not realized. Employment of a keyboard as the entry mechanism also limits the utility of very small portable computers because the restricted keyboard size makes data entry very inefficient. Thus, one could not effectively enter meeting notes on a current computer designed to fit into a vest pocket. There are other disadvantages associated with the keyboard entry mechanism. Different keyboards are required for cultures with different character sets. Also, the keyboard can not provide the communicative power of a drawing.

Generally, it seems preferable to carry out most written information processing using a pencil or pen and a variety of manual storage and retrieval devices. These include scratch pads, file folders and drawers, our all-important appointment book and "to do" lists, and, of course our desk top, heaped high with reports, papers, notes, reminders, at least one stack of magazines and other paraphernalia indicative of the rather chaotic way we carry out our information handling. Thus, in spite of the many potential benefits the personal computer can offer, we continue to conduct most of our information processing with paper, pencil, and other manual instruments.

Thus, it is clear that heretofore the requirement that information be entered via a keyboard represents a significant impediment to greater computer usage in terms of: 1) number of users; 2) number of beneficial applications; and 3) derivation of consequent productivity benefits.

Feasibility of Handwriting into the Computer

Conceptually, an interface which allowed users to handwrite information into the computer could alleviate these drawbacks. However, until recently, this idea was not greeted with much enthusiasm for several reasons. First, the required hardware accompaniments to enter and display such graphics were excessively costly or rather crude. Secondly, there seemed to be a general sentiment which suggested that information stored in a computer must be digitalized to be useful, and a practical system to digitize (i.e. recognize) handwriting (as opposed to printing) had not been developed, nor has it yet.

In the last several years, significant advances in hardware performance and dramatic reductions in costs have combined to make the physical entry of handwriting into a personal computer feasible and practical. It has become possible to combine a flat panel display of significantly high resolution with a high-resolution, transparent, digitizing tablet to develop what might be described as a screen tablet. Such a device represents a combined display and entry device about the size of a tablet of paper and approximately 2.5 cm. thick and may be placed on the desk or lap for use. The screen tablet has a pen which is attached by a wire to the digitizer and functions in a manner identical to the pen used with graphic tablets allowing the user to "write" or draw on the transparent digitizing surface, and have the writing show up on the flat panel display which underlies the digitizing surface. Such devices are available through several commercial sources including MicroTouch Inc. of Woburn, Mass. or Toishiba Advanced Systems Division of Irvine, Calif. However, because an appropriate information management system has not been available, their potential has not been fully exploited as an entry means to a system which could provide computerized assistance to the major share of a user's daily written information processing.

The feasibility of handwriting into the computer is made more apparent by the realization that it is not even necessary to have a keyboard to supply the limited amount of digitization needed to index graphical handwritten information. I have made an analysis of the items which constitute the bulk of our daily information processing. This analysis indicated that only a very minor part of the information (or an adjunct to it such as a file description) needed to be digitized to accomplish the desired information processing functions. For example, to send a note or memo to a colleague, only the electronic address of the intended receiver need be in digital format; the text or body of the information can remain in the graphic form in which it was entered and will be displayed by the recipient exactly as a handwritten note on his display. Additionally, the very minor amount of information which must be supplied in a digital format can be either selected from a list of menu items (such as the names of users on a network) or "keyed" in by touching graphic representations of "keys" pictured on the display. Thus, if a user wished to store handwritten notes taken during a telephone conversation, it can be accomplished by simply touching a sequence of graphic "keys" on the display to describe a desired file name, followed by another graphic button entitled "FILE".

Finally, development of handwriting interfaces has been facilitated by the appearance of software development systems which provide extensive capabilities for merging graphic and textual computer representations and offer the computer developer macro tools for manipulating graphics and text in what appears to be an almost seamless way. In summary, keyboards represent an impediment to realization of computer benefits and, they are unnecessary. It has become feasible, practical and highly desireable to handwrite directly into the computer.

Patents on Handwriting in Computers

Heretofore, a variety of approaches were made to apply handwriting in limited areas as opposed to the totality of the individual's daily written information processing. The following patents deal with handwriting editing (principally, reformatting to improve legibility or more remotely character recognition and combination display screen/graphic tablet technology. Fox et al, (in U.S. Pat. No. 4,727,588, Feb. 23, 1988) shows a system for handwriting duplication for multiple printed copies. Hardin Sr. et al, (in U.S. Pat. No. 4,817,034, Mar. 28, 1989) shows a system for document editing. Barker et al, (U.S. Pat. No. 4,815,029, Mar. 21, 1989) shows a system which allows manipulation of both graphic and textual images similar to text publishing programs now popular. None of these systems seek to apply handwriting computer technology to areas of high volume daily information processing where it could do the most good.

Handwriting Digitization Efforts

Interest in the use of handwriting in personal computers is definitely on the increase. The most notable area involves character recognition of hand printed characters. The erroneous belief apparently still persists that in order to be useful, information stored within a computer must be digitized. There are both significant research activities and commercial manifestations of this interest by parties at Linus Technologies, Reston, Va., Grid Computer Systems, Fremont, Calif., and at the IBM Research Laboratories in Yorktown Heights, N.Y. Although recognition of hand printed characters possesses the desirable property of being a very natural entry medium it has numerous drawbacks. It generally requires that the user pattern-train the computer to recognize the individual's printed characters. Without training, recognition errors are often excessive. This then, restricts entry to users who have "trained" the computer. In addition, entry errors often occur if the user varies the way the character is drawn. Finally, greater computer processing resources (CPU cycles) are required than with other entry mechanisms. In short, it is questionable whether much net benefit derives from the digitization of hand-printed characters through character recognition methods, particularly, when there exist other means for entering characters which possess fewer drawbacks, yet do not require a keyboard.

Handwriting Annotation to Text

A more closely related manifestation of handwriting computerization has been developed for personal computers by Wang Laboratories of Lowell, Mass. Wang's system, sold under the trademark Freestyle, consists of a graphic tablet, a plug-in expansion board and accompanying software. Its primary purpose is to enable a user to annotate captured screen images both with handwritten notes and voice messages. The system works by performing a screen capture of whatever is displayed, suspending operation of the current application, and invoking the Freestyle software. The user may then annotate the captured display either with handwritten graphics or with voice supplied through a modem connected telephone.

By using a special display image of a blank "piece of paper", a handwritten note may be created. The blank sheets also possess a very rudimentary capability to accept keyboard entered text (no editing except backspace erase). Such a composite file consisting of text (or other application data), voice and graphic elements may be stored, retrieved, or transmitted to other users. Similar such composite file objects may also be attached and detached to one another.

By means of a recording and playback feature, handwritten notes and voice annotation may be recorded, for example, on a spreadsheet document sent by another user. These "comments" may then be passed along to another user, or returned to the originator. Additional functions include the capability to organize iconic images representing the handwritten notes or annotated sheets by moving them around upon a "desktop" interface display. They may also be copied, printed, deleted, aggregated (or separated). While the Wang work represents a significant effort to introduce handwriting into the computer, it evidences substantial drawbacks and limitations.

The Wang system is narrowly focused on a business environment, most likely at the management level, as opposed to being a general purpose tool for simply any computer user. In particular, the system is marketed as a component of the Wang office computing environment. Its focus is further limited in that the functions are oriented more toward "annotation" of existing documents than to assumption of all the users handwritten information commerce. For example, Wang marketing information illustrates capabilities for applying a "handwritten" signature to a travel authorization form or annotating a budget spreadsheet received from a coworker. In particular, the system effectively requires connection to a Local Area Network (LAN) (or have LAN server software installed on the computer) to file (store) substantial amounts of information. Each individual file possesses an icon on the desk-top interface. The available desktop space is reduced by the creation of each new document unless the documents are stacked. This is a disadvantageous solution because the "stacks" would have to be un-stacked to identify their member elements. Thus they are moved (stored) off the desktop in a "file cabinet" which constitutes a subdirectory on a LAN file server. Its business heritage is further evidenced by a feature which allows a user to see the history of a document's movement from among users. That is, the focus of the system is to track documents through their life cycle while preserving anecdotal additions. It has neither the tools nor capability to assume a user's entire handwritten information commerce.

The system is also designed strictly for one-time annotation or creation of an handwritten note. There is no capability for manipulating elements of handwritten material or for subsequent modification. Once the handwritten material is "saved", i.e., committed to file storage status, it cannot be modified, only erased totally. This prevents the system from being used with information in an appointment book or "to-do" list format where the capability for updating an information element is critical. This limitation upon the manipulation of handwritten information elements also effectively prevents the facile organization and combination of multiple handwritten information elements which may be contained as sub-elements of other handwritten information sources into a combined handwritten document. Such a capability is key to assembly of a report, outline or paper drawing on separately stored information sub-elements (ideas, facts and other). Because this kind of information assembly is a very prominent information processing activity, it represents a severe limitation of the system.

The inability of the Wang system to allow substantial revision of text also makes impossible a very desirable use of computerized handwritten information. That is the ability to revise textual material based upon handwritten notes committed directly on or around the text. For example, it is highly desirable to "edit" a typewritten letter or other text document by making handwritten notes in the margins or within the text itself such that the typist or originator can make changes to the text based upon the handwritten notes.

The Wang system also relies on a graphic tablet and a conventional monitor which presents a hand-to-eye coordination problem for handwriting. The display image of the handwriting is dislocated from the writing surface. Because the Wang system requires a keyboard, it is not suitable for use on tiny vest-pocket-size computers as miniaturized keyboards cannot effectively be used to enter and significant volume of written information. "Paging through" individually created notes on the Wang system is tedious because associated documents in a single pile which are not aggregated into a single file, must be un-stacked one by one. Also, there is no way to separate text and graphics. The Wang system also has no drawing tools. In short the Wang system is not a general purpose computerized handwriting system and possesses numerous limitations and drawbacks.

SUMMARY OF PRIOR-ART DRAWBACKS AND LIMITATIONS

The drawbacks and limitations of prior-art systems can be summarized as follows. As the sole general purpose vehicle for data entry, the keyboard constrains the proliferation of computer benefits by limiting the numbers of users and the number of feasible applications. It also promotes duplication of file storage systems by requiring separate storage for handwritten items and requires the use of paper for handwritten annotations. Previous efforts to implement a partial handwriting interface, while, representing a step forward, manifest the drawbacks described above. Prior systems have concentrated upon the applying computer assistance to only relatively isolated pieces of the individuals information commerce. This approach does not attempt to accommodate the entire spectrum of individual information processing needs and thereby forgoes the opportunity for synergistic benefits which could complement specific application gains.

Systems developed heretofore have not been of a comprehensive nature and as such do not enjoy extensive positive feedback which magnifies benefits. By including capabilities for handling almost all types of information processing, extensive use of the system is encouraged, resulting in correspondingly more benefits. In addition some of the previous work to computerize daily information processing such as applications for appointment and calendar recording, reminder notations and short note documentation, have not represented workable solutions because the data entry effort is usually greater than the payoff.

OBJECTS AND ADVANTAGES

Accordingly, the several objects of the present invention are to provide a computer system which: 1) allows both entry of handwritten data into the computer and operation of the computer by means of a pen; 2) may be alternately operated by means of a conventional keyboard; and 3) can manipulate handwritten data or textual information to accommodate an unrestricted spectrum of commonly-encountered daily information processing tasks.

Such a system overcomes the usage difficulties of keyboard systems thereby prompting the extension of computer benefits such as speed of information retrieval, storage, transmission, and manipulation to broad classes of new users. It also makes feasible many new uses. Virtually all of the vast amount of commonly-experienced, daily, written information processing currently carried out by hand, may now benefit from computer assistance. It further allows extension of computer benefits associated with full-sized keyboard systems to new miniaturized keyboard-less hardware such as tiny vest-pocket-sized computers. Specific benefits include significant labor savings, reduction in information processing throughput time, and cost savings associated with reductions in file storage requirements and paper usage. Advantages also include the following quality benefits: reductions in lost information and learning requirements; enhanced communication through use of drawings; and simultaneous recording of information on paper and in the computer. Further objects and advantages will become apparent from consideration of the ensuing description and drawings.

DRAWING FIGURES

In the drawings, closely related figures have the same number but different alphabetic suffixes.

FIG. 1A shows a system diagram of a non-portable embodiment of a computer system employing a screen tablet, a computer and peripherals used in accordance with the present invention including a detailed view of the screen tablet.

FIG. 1B shows detail of a portable vest-pocket size embodiment of the screen tablet and a miniature computer used in accordance with an alternative embodiment of the present invention.

REFERENCE NUMERALS IN DRAWINGS

Figure 2:
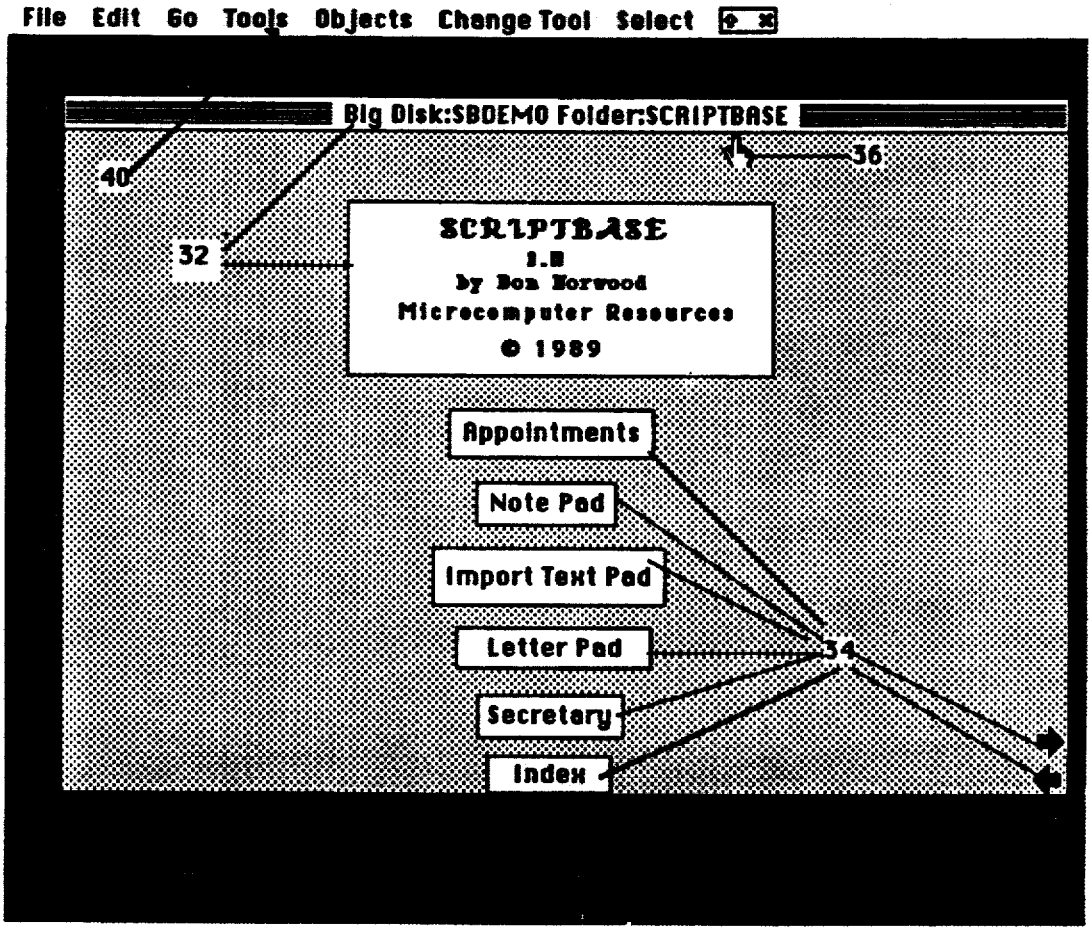
FIG. 2 shows a computer screen displaying a Main Menu of a software program used in accordance with the present invention.

18 screen tablet
19 cable connecting screen tablet and computer
20 flat panel display
21 computer and peripherals
22 transparent digitizing tablet
23 cable connecting digitizing tablet and computer
24 screen tablet pen
25 handwriting shown on the screen tablet
26 portable ancillary unit screen tablet
28 portable ancillary unit computer
30 cable to upload/download data between portable and main units
32 background of Main Menu
34 buttons
36 cursor
38 pen button
40 menu bar
41 Change Tool menu
42 icons for files
43 Select menu
44 previous card button
46 next card button
48 Secretary module button
50 ScriptBase module button 52 Index button
54 "Appointments/To-Do" button
56 Address Book button
58 Return button
60 Button keys
62 New blank card button
64 Cut Card button
66 Paste card button
68 Copy card button
70 Type button
72 Run button
74 Tel-Assist button
76 Go/Srch button
78 Remind button
82 Data stamp button
84 FILE button
86 file (index) button
88 Make Button button
90 Reset buttons
92 ltr (letter) button
94 Export button
96 Import button
98 Link button
100 Update button ("Appointments/To-Do" module)
102 Delete button—"Appointments/To-Do" module
104 Sticky-Link button
106 Tel-Assist telephone number
108 Find button
110 DB (datebook) Long Range Calendar button
112 Xpand (expansion) button
114 Update button—Secretary module
116 WP (word processor) button
118 "Appointments/To-Do" jump button
120 check box
122 handwritten letter
124 New check button
126 Account balance field
128 Reset dollar amount field
130 return
132 Tab button
134 Find check button
136 Date field
138 Payee and Memo
140 Amount button
142 Check number field
144 Amount field

GENERAL DESCRIPTION

A hybrid information system for handwriting and text in accordance with the present invention consists of three principal components: (1) a hardware device, or "screen tablet", shown in FIG. 1A, for entering and displaying graphic computer data, (2) programs for controlling and causing the computer to handle the entry of handwritten and textual information and manipulate same, and (3) a general purpose computer, also shown in FIG. 1A.

DESCRIPTION OF HARDWARE COMPONENTS

A screen tablet 18, a composite entry and display device, consists of two connected parts: (1) a flat panel display 20 (electroluminescent, LCD (Liquid Crystal Display), plasma, active matrix, etc.); and (2) a transparent digitizing tablet 22 which lies atop the display. A connected pen (or stylus) 24 accompanies tablet 22.

Tablet 22 functions exactly as a regular digitizing tablet but allows the user to see through it to view material shown on screen 20 beneath. Thus, the pen, in combination with the tablet's surface can sense the location of the pen tip on the tablet and transmit the coordinates of the pen to the computer which, using appropriate software (described below), displays the coordinate information as a cursor. Similarly, with the software, a user can write on the surface of tablet 22 so that the writing 25 shows on screen 20 at the tip of the pen. Tablet 22 is connected to a serial input port of a computer 21 by a cable 19. Display 20 is the same as a flat panel display of a laptop computer and is connected to a display interface card attached to the bus of computer 21 by a cable 23. A optional cable 30 may be used to connect a serial port of computer 21 to a serial port of another computer which serves as a portable ancillary unit. Screen tablet 18 is available through several commercial sources, including MicroTouch Inc. of Woburn, Mass., or Toishiba Advanced Systems Division of Irvine, Calif.

Tablet 18 is about the size of a regular scratch pad (21.6 cm by 28 cm) and is about 2.5 cm thick. It may be used on a desk or placed comfortably on the lap like a conventional clipboard. The device has a conventional leg support or strut (not shown) which may be extended from the back (in a manner similar to a desk top picture frame) such that tablet 18 can be positioned vertically in a free standing position, similar to the screen of a conventional computer display.

The following description of the features of tablet 18 assumes use of companion software which is part of the system and which is explained below. When a user draws lines on the surface of tablet 18 with a pen 24, they are instantly displayed on screen 20. In this particular application, the lines drawn generally will be handwriting. Simply put, in the mode of operation referred to as "writing" mode, the user handwrites on tablet 18 and the writing appears on the screen, just as it would, for example, on a scratch pad.

Alternately, the user may operate the screen tablet in a "choose" mode by depressing a side button 38 on pen 24. The side button is a standard feature of a screen tablet device. Depression of this button sends a signal to the computer which may be programmed to carry out specific actions upon receipt of the signal. In the choose mode the pen tip becomes a graphic cursor (or pointer) in the shape of a hand with an extended finger, as shown at 36 in FIG. 2. The choose mode is used to pick items from pull-down menus on the screen or to activate graphic buttons by touching the desired object button with the tip of the finger. The user can switch between write and choose modes with alternate depressions of button 38. Depressing button 38 twice quickly in succession turns the cursor into an eraser which erases screen material at the tip of the pen. This erase function is similar to that found in common paint programs.

In a "select" mode, pen 24 may be touched at a spot, then dragged to show a rectangle which can be moved around and thereby enclose selected material on the screen. The selected material (either handwriting or text), may then be manipulated (moved, copied, or deleted) through software options. In this fashion, the user can enter handwritten information into the computer simply by writing on tablet 18, execute operations by touching buttons, or select items from menus by touching elements of the item list. Tablet 18 also functions as a conventional flat panel computer display which echoes characters typed on a computer keyboard or displays screen output from conventional programs. A suitable computer is a personal computer such as the one sold under the trademark of Apple Macintosh II however, the system is not dependent upon the type of computer used.

DESCRIPTION OF SOFTWARE

The software component of this system consists of a set of application programs. These are interpretive routines which execute under the control of the HyperCard brand software development system from Apple Computer Co. The set of programs can also be configured as a stand-alone application program. The software generates computer-based analogies and/or substitutes for manual information processing appliances such as appointment books, scratch pads, etc. and processes such as letter writing, document annotation, and others. These computer appliances accept handwritten graphic inputs, and can generate digital character input by touch selections from screen tablet displays. They are the mechanisms through which computerization benefits, such as speed of storage, retrieval, transmission, manipulation, etc. are realized. Examples of these computer-based analogies include an appointment book, "to-do" lists, file cards, file folders, scratch pad, stick-on notes, and tickler files (reminder files). Newly developed substitutes for manual processes include a combination scratch pad/typing window and a document annotation appliance. A full listing of this set of application programs is provided in a microfiche Appendix. These programs can be run on the Macintosh II computer, with a screen tablet connected as shown in FIG. 1A or with a conventional graphic tablet and monitor.

The software analogies represent a combination of: (1) graphic replicas of their manual counterparts; (2) certain highly novel productivity features; (3) menu buttons similar to those one might see on a traditional PC application screen, and (4) miniaturized keyboard buttons for the alphabet and numbers 0–9, as well as miscellaneous symbols. Menu buttons may incorporate pull-down or pop-up windows. Menu buttons are selected to accomplish specific computer tasks, such as cut, paste, copy, file, jump, return, switch mode (writing/button selection). In the case of the button keys, they provide digital information for filing or other computer purposes.

In addition, the system incorporates program objects which may be created by user command. These program objects appear as images on the screen and may possess a variety of physical shapes and sizes including that of a button or a field. In some cases they may be moved about by the user. Program objects may themselves be programmed and the program associated with the object activated by the user to perform specific actions.

Furthermore, certain button program objects may possess qualities of both a field and a button. Such a program object may be characterized as a "field-button". Upon selection (activation) the appearance of a field-button changes to represent a field which accepts data from the user. Once the data has been entered, the button may resume its operational (action) role by acting on the data entered to accomplish a task such as dialing a telephone through an attached modem. The following buttons possess this field-button characteristic: Update 100, Find 108, File Index 86, Remind 78, Check Amount 140, and Tel-Assist 74.

Figure 12:
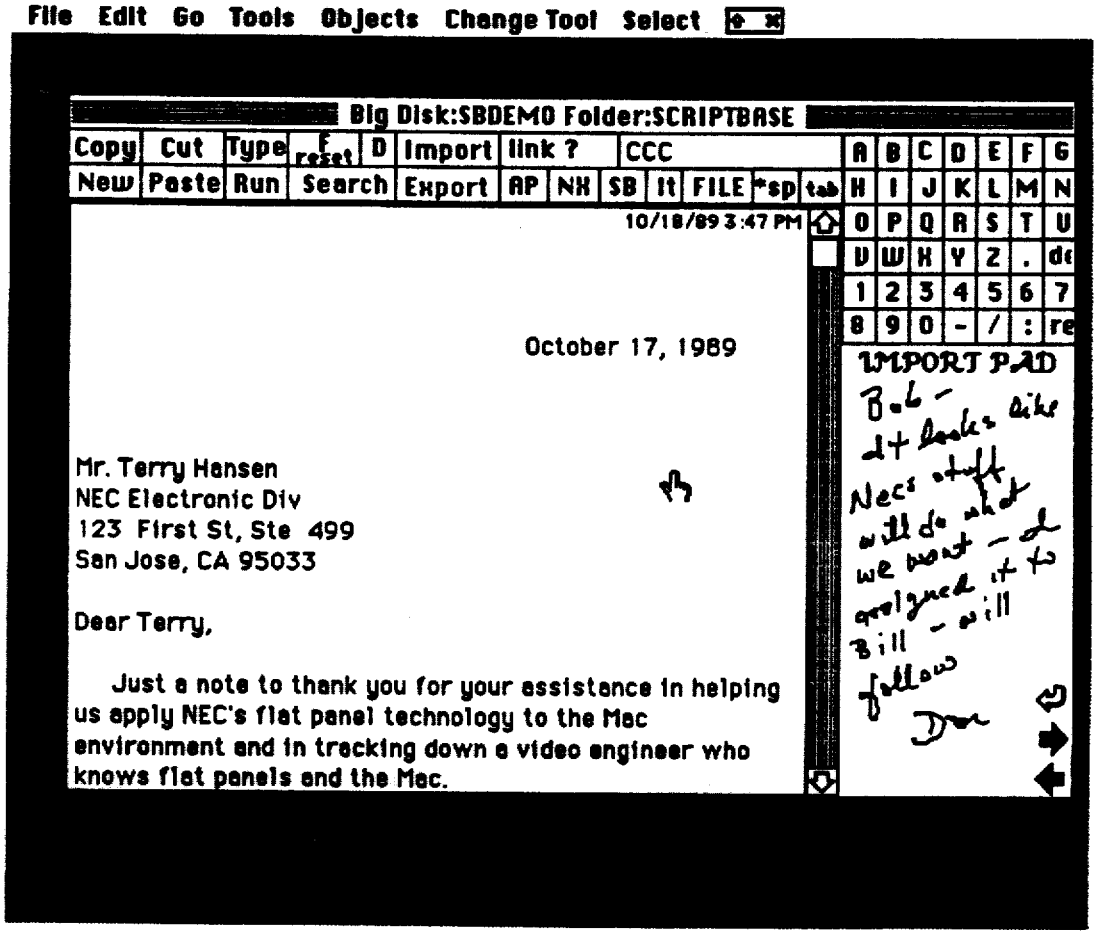
FIG. 12 shows a computer screen displaying a scrolling text document with a handwritten annotation on the first page only.

In addition to the analogs of manual information processing, this system features several appliances which have no manual counterparts. One of these, shown in FIG. 12, is called the Import Pad and represents a means for bringing (importing) a computerized text document onto the screen such that it can be annotated with handwritten notes. The incoming document can be displayed in two ways. One method of display spreads the text across numerous pages such that each page offers ample room for handwritten annotation to any text element. The other method, shown in FIG. 13, brings the entire document into a text window on a single page such that the user can scroll through the material in the window to read the entire document. In this mode, as shown in FIG. 12, the user may not annotate throughout the body of the text, but may write notations above and aside the text window. This latter mode is useful for sending a document with an accompanying handwritten note, while the former is best applied for annotation throughout textual documents.

Figure 14:
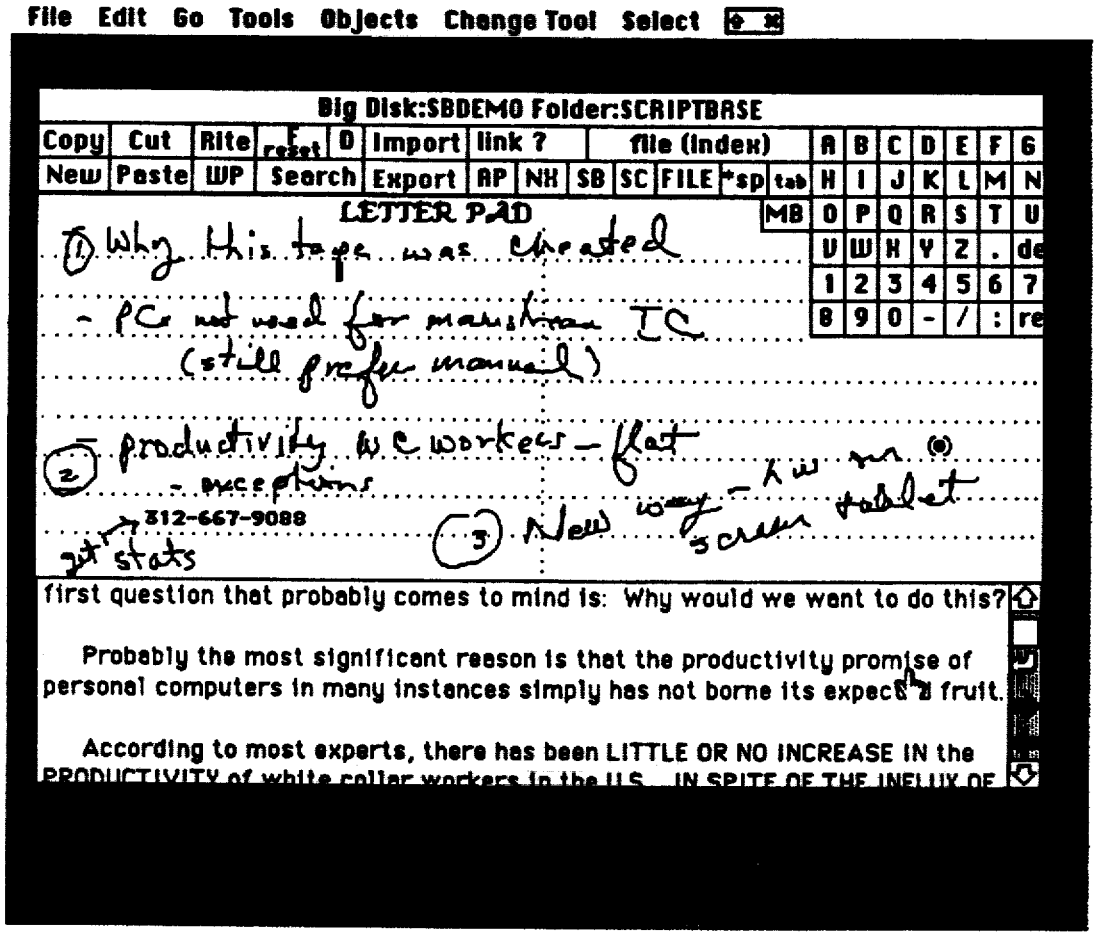
FIG. 14 shows a computer screen displaying a handwritten outline with a Sticky-Link button to supporting data cards for use in composing, organizing and typing a text document.
Figure 15:
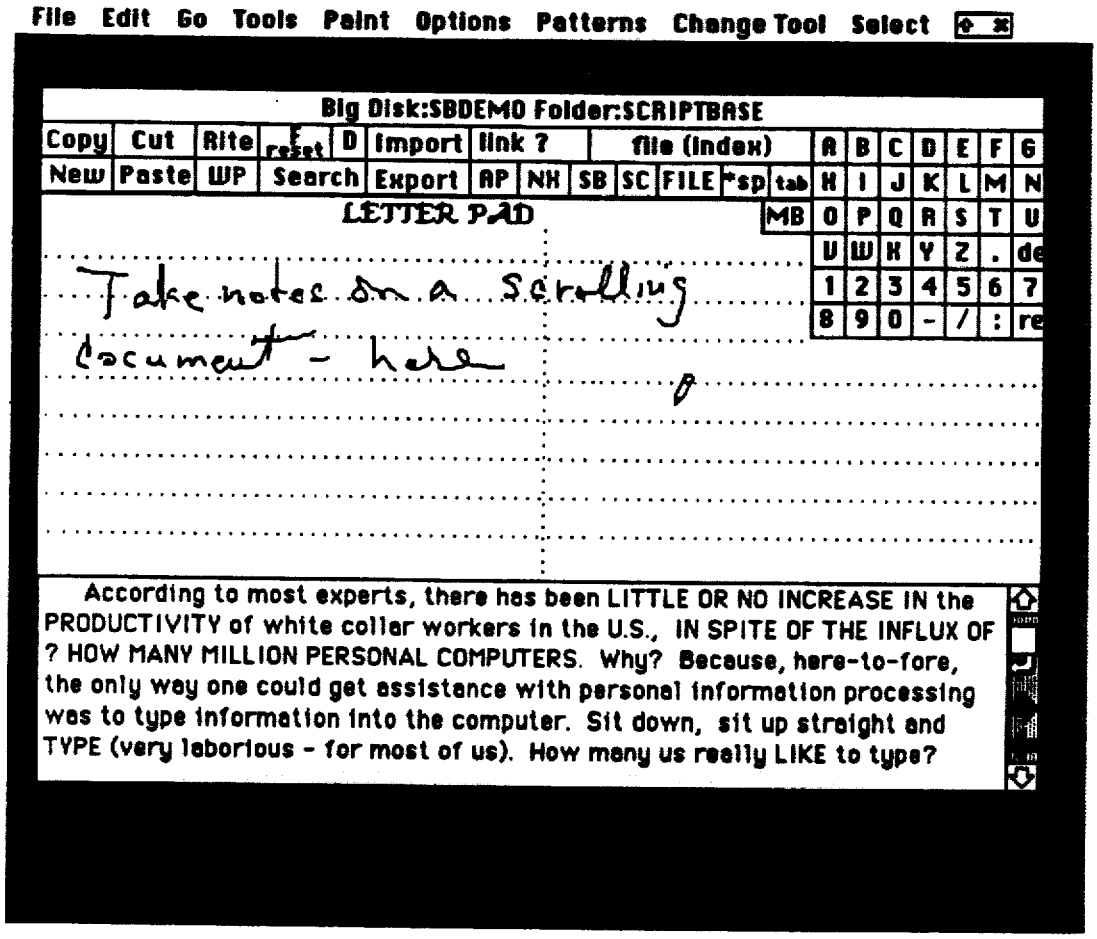
FIG. 15 shows a computer screen displaying a Letter Pad for taking notes from a text document used in accordance with the present invention.

Another element which has no manual analog represents a combination scratch pad for handwriting and a word processor, as shown in FIG. 14. Two-thirds of the screen represents a scratch pad for writing ideas, thoughts, etc. that might be incorporated into a text document. The latter may be created in a scrollable typing window which occupies the other one-third of the screen. Another extremely productive application for this combination writing/typing device, involves its use as a means for taking handwritten notes while reading a textual document which has been imported into the computer. FIG. 15 illustrates this use. Thus, for example, a text document which may have been scanned in or received from other computer users on a network, or retrieved from other storage, may be called up into the text window. The user may scroll the text and take notes on the handwriting window portion of the screen while reading. These notes may be stored on consecutive pages or the handwriting area may also be scrolled to accommodate the length of the notes. Upon conclusion, the notes may be easily filed. A module for use by a typist to translate handwritten material into typewritten text represents a third non-analogous module.

DETAILS OF SOFTWARE ENTITIES

The information presented here, under Operation, and in the microfiche Appendix is sufficient to enable construction of the system by a worker knowledgeable in use of the HyperCard software development system. Employment of HyperCard terminology where relevant will assist in realizing this objective. The primary software entities consist of a set of files ("stacks" in HyperCard vernacular), each possessing capabilities and attributes unique to its function. These file structures contain data records ("cards" in the language of HyperCard) as well as application programs. As shown in FIG. 2, a stack contains one or more display format templates (backgrounds) 32 which contain "buttons" 34 for navigation within the software or for initiating feature functions. It should be noted that the term "button" in this specification shall refer to a generalized functional element which initiates a sequence of commands upon being actuated rather than to any specific button shape. The templates may also contain fields for data entry. Execution of a button's function is accomplished by placing the pen atop the button and pushing down on the tip. By means of a feature of the software, included in each module, the pen mode may be changed between write, choose, and erase modes as described above.

Figure 3:
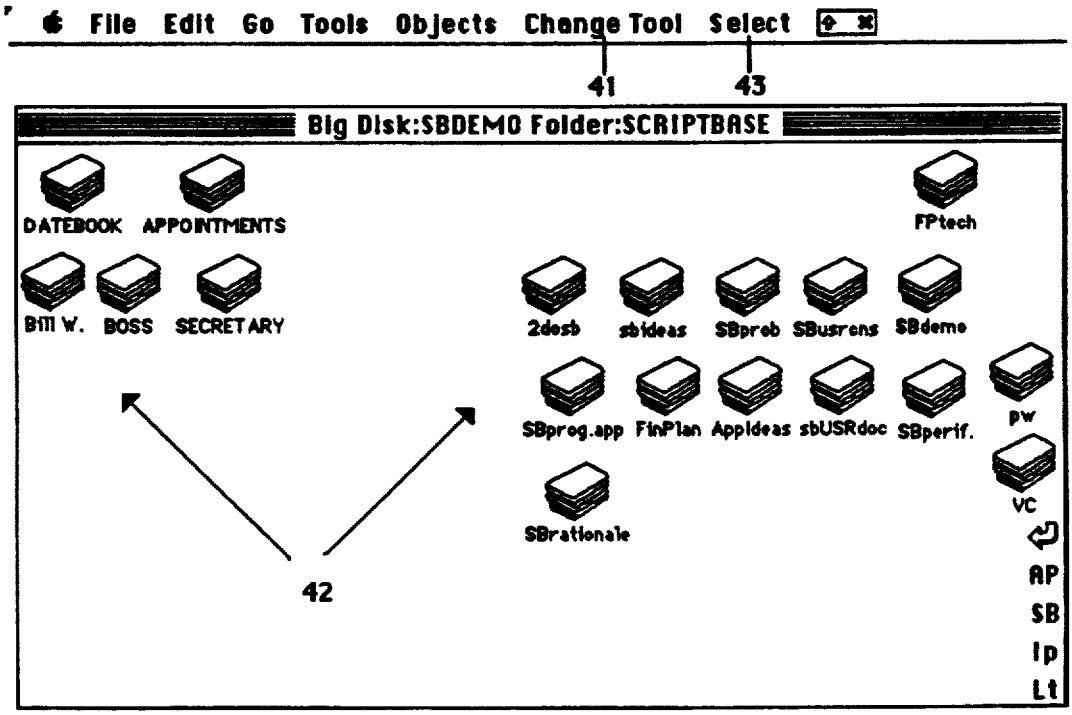
FIG. 3 shows a computer screen displaying a file index of the software program.

The screen templates (backgrounds) also contain a menu bar 40 displaying names of submenus which expand upon selection to display a choice list. With the exception of Change Tool and Select, these menus are permanent fixtures of the HyperCard system. Numerous of the choices offered by these menus have been accommodated in a way more suitable to the system's requirements by customized buttons, and thus are not used (although they are operational). The following menu features are utilized. File Menu: Compact Stack (delete excess space in files), Protect Stack (set a confidential stack access code), Delete Stack, and printing functions; Edit Menu: Undo, and the Cut, Copy, Paste and Clear functions for graphics. The two following menus were added as shown in FIG. 3: Change Tool 41 (select button/field selection tool, pencil tool, or eraser tool); and Select 43 (choose graphic selection tool mode).

Specifically, the functions and the objects of these modules are:

(1) A planning and scheduling module ("Appointments/To-Do") which: (a) automates certain work task planning and scheduling operations; (b) functions as a center for organization and control of work tasks and their associated supporting information files; (c) creates linkages between work task items and supporting information files to automate retrieval of the latter.

(2) A note creation module (Note Pad) which accommodates both handwriting and text which features automatic file recall based upon dates.

(3) A module (Import Pad) which allows handwritten annotation of text.

(4) A module (Secretary) which automates aspects of the document production process between author and secretary involving handwritten source material and handwritten annotation of draft text.

(5) A module (Letter Pad) which (a) provides computer assistance to automate aspects of the formal document creation process which involve handwriting; and (b) provides a means for handwriting notes into the computer while reading a scrolling text document.

Figure 4:
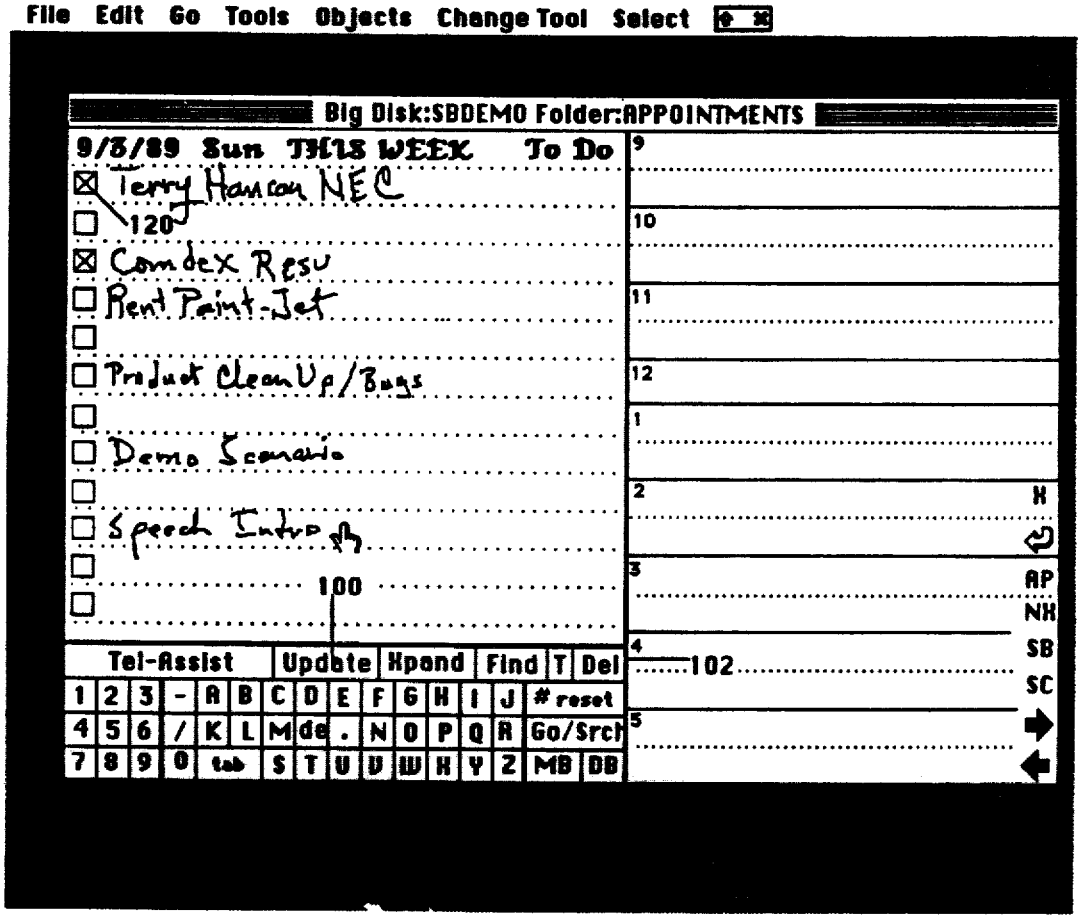
FIG. 4 shows a computer screen displaying "to-do" items in an "Appointments/To-Do" module used in accordance with the present invention.
Figure 6:
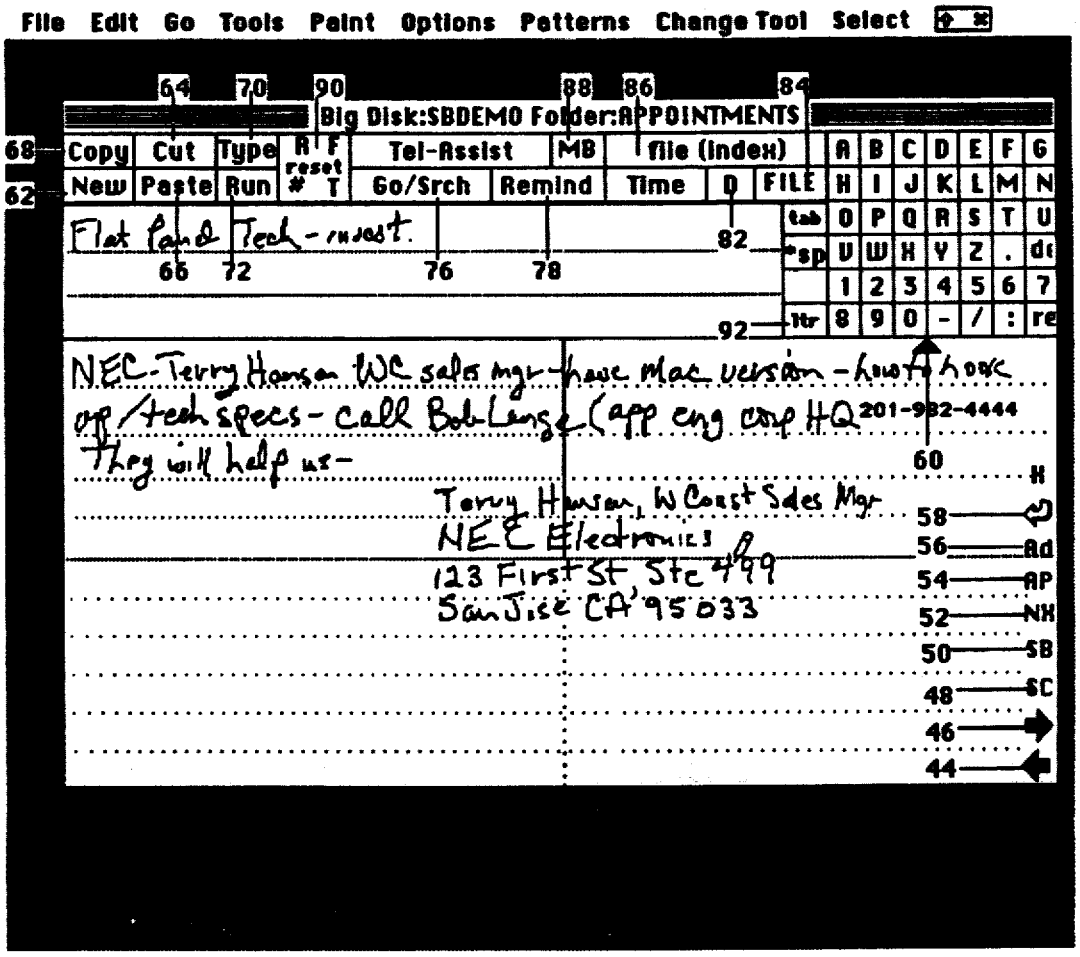
FIG. 6 shows a computer screen displaying a card of the Note Pad format as an expansion card in the "Appointments/To-Do" module.
Figure 9:
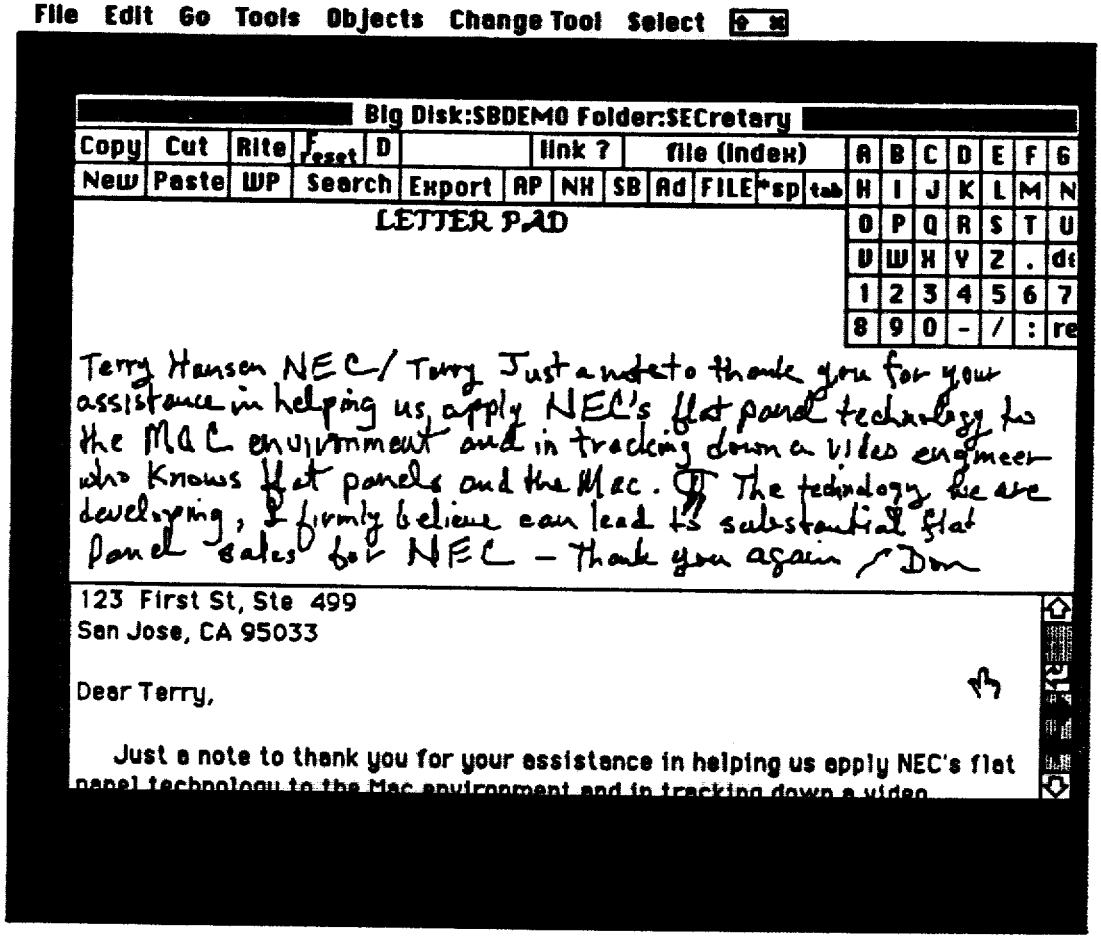
FIG. 9 shows a computer screen displaying a handwritten letter as source material (from FIG. 8) as it is received into the Secretary module and the draft typewritten letter.
Figure 10:
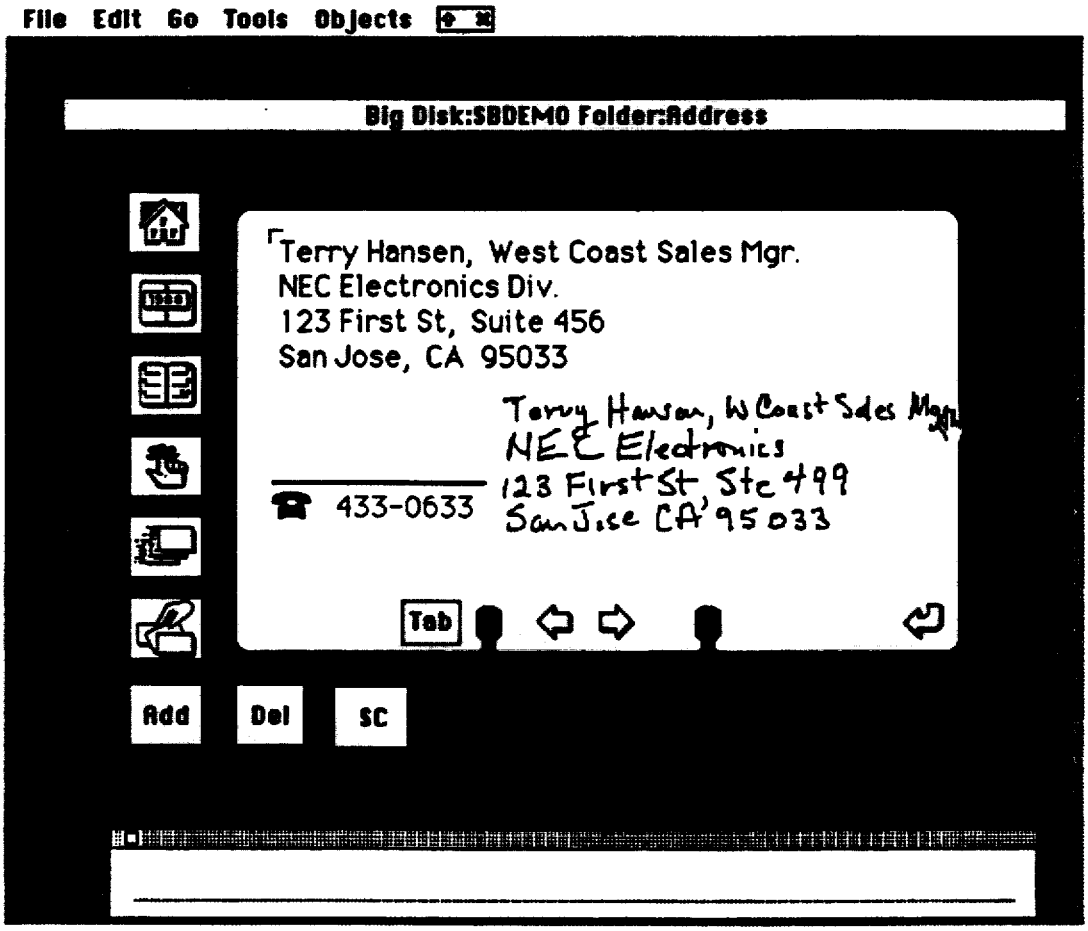
FIG. 10 shows a computer screen displaying an Address Book with handwritten and typed entries used in accordance with the present invention.
Figure 16:
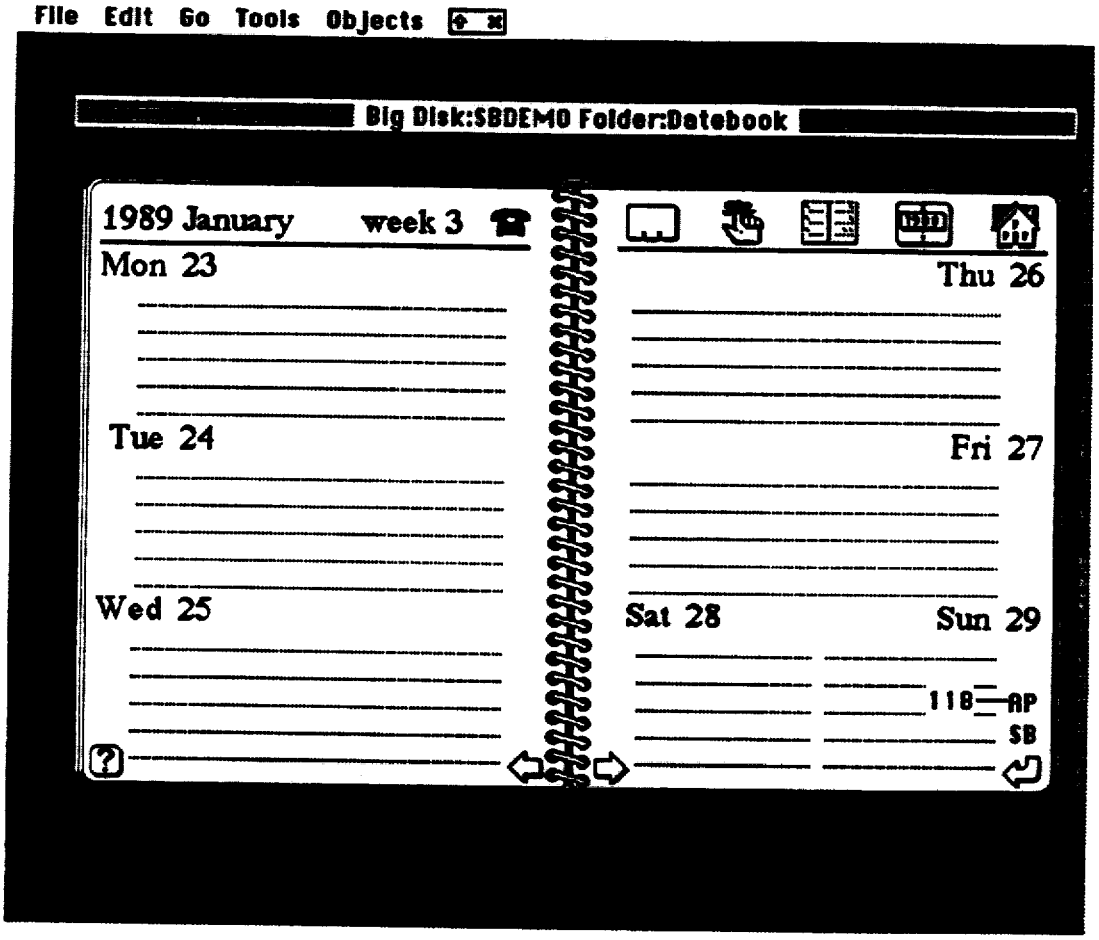
FIG. 16 shows a computer screen displaying the Long Range Calendar format used in accordance with the present invention.

The system consists of a main (stack) entitled "ScriptBase" which includes the following display templates (backgrounds): the Main Menu as shown in FIG. 2, the Index as shown in FIG. 3, the Note Pad as shown in FIG. 6, the Import Pad as shown in FIG. 12, the Letter Pad as shown in FIG. 14 and Reminders (the Reminders background is simply a full card field for storing reminder dates and their associated file card names. Other stacks are: Appointments/To-Do as shown in FIG. 4, Long-Range Calendar as shown in FIG. 16, Address Book as shown in FIG. 10, and Secretary as shown in FIG. 9. The structure of the main module will be described first.

As shown in FIG. 2, the Main Menu displays selection choices represented by buttons 34. These buttons, when touched by the pen, take the user to the stack or background with the desired functions. The Index, shown in FIG. 3, represents a card displaying icons 42 for stacks which may be applications or data files. New data icons are automatically created by a stack program when the user decides to file information (handwritten or text) for which there is no existing file name. Upon creation, the user may move the icon and fix it in the desired location.

PRIMARY OPERATING BUTTONS

The Note Pad, illustrated in FIG. 6, constitutes the primary entry format (card background) for handwritten information, although text may also be typed into this format. The lower right-hand edge contains a set of navigational buttons 44–58. Placing the pen stop any one of these buttons will "jump" the user to any of the following software destinations: previous card 44, next card 46, Secretary 48, ScriptBase Main Menu 50, Index 52, "Appointments/To-Do" 54, Address Book 56, and Return 58 (to location preceding last jump). The accompanying software routines save the current location and branch to the target. A Return button on the target enables an instant jump return. Of key importance is a set of button keys 60 which, upon touch, provide the computer with digital characters, numbers, or symbols for file names, times, dates, telephone numbers or other uses. These function in a manner subordinate to other buttons by supplying digital data to a field opened by the primary button. This is accomplished in the program by using the name of the target button. Functions for creating new blank cards, or cutting, pasting, or copying them are accomplished with the buttons of corresponding names: New 62, Cut 64, Paste 66. Copy 68. A "Type" button 70 allows the user to switch between typing and handwriting. The Run button 72, lets the user exit the current program to run another program.

Figure 5:
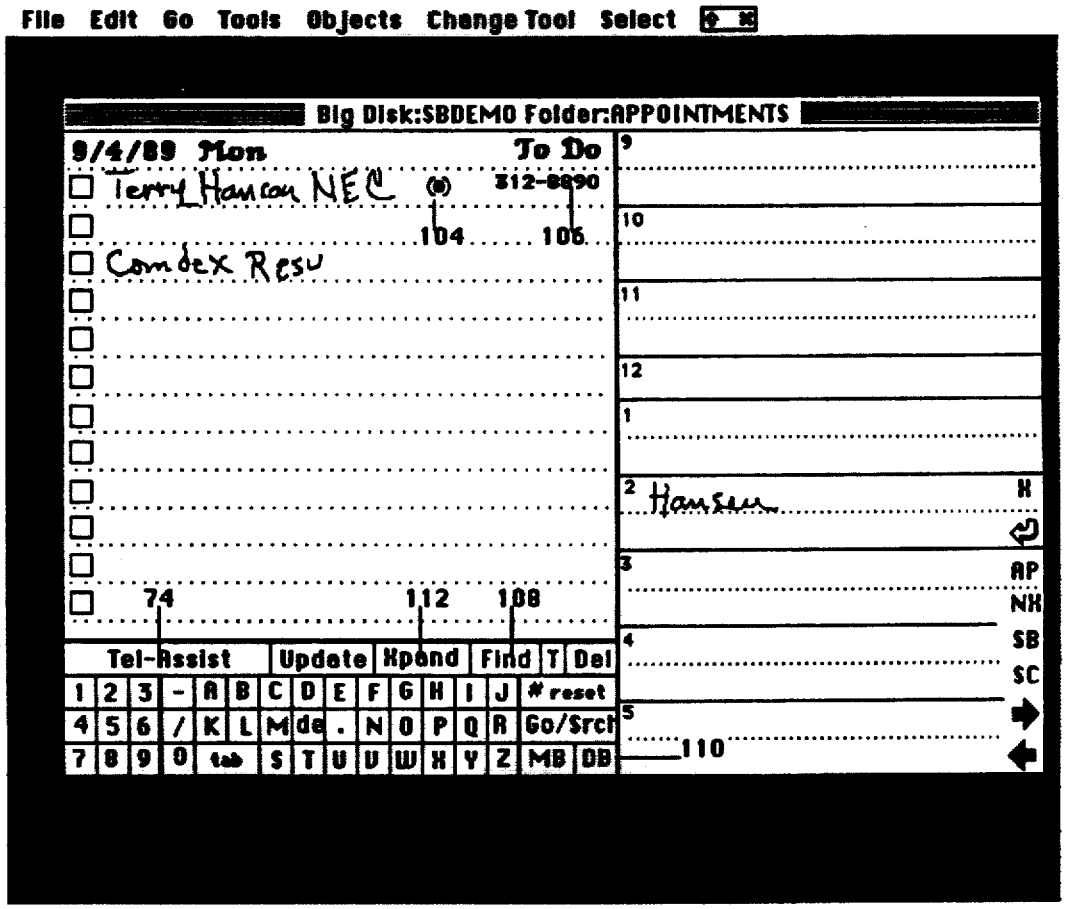
FIG. 5 shows a computer screen displaying "to-do" items allocated to Monday, a Sticky-Link button and a Tel-Assist button used in accordance with the present invention.

The button named "Tel-Assist" 74, shown in FIG. 5, represents a button which turns into a field to accommodate a telephone number entry; can be moved to any location, and when fixed, returns to a button state. The program associated with this "data" button then allows the user to "dial" the imbedded number by touching it with the pen. This is accomplished programmatically by creating a new data field, entering the number either from an Address book selection or by button keys, then locking the field such that it can function as a button and execute a routine that dials the number through an attached modem.

A Go/Srch button 76 provides a mechanism for searching through a stack of cards (an information file) for a specific card heading. A Remind button 78 allows the user to attach a specific date to a data card. Upon start up, the computer selectively displays data cards associated with a date equal to the current date. A "D" (date) button 82 upon touch provides a date/time stamp which can be placed anywhere on the data card. A FILE button 84 works in conjunction with data supplied to a "file (index)" button 86. Touching the file (index) button changes it into a field to accommodate entry of a file name. Subsequent selection of the file button will file the card under the given file (index) name (if valid). If the name does not exist, the user may choose to create a new file with the name given, or jump to the index to select the name of an existing file. The button routine then proceeds to file the card, creating a new index entry if necessary. "MB" is the acronym for a "make button" operation. Button 88 associated with this function lets the user create and place a button on a data card which, when actuated, jumps the user to another data card. Three buttons R, F, and #90 are provided to reset the Reminder, File (index), and Telephone number fields, if necessary. A Ltr button 92 copies handwriting committed to the lower one-third of this screen to the Secretary module for preparation into a typewritten document.

The second module of the ScriptBase stack is the Import Pad shown in FIG. 12. The Import Pad is used to make handwritten annotations upon a text document in either of two ways. If the user desires to make a handwritten note only on the first page of a document, a scrolling text mode is used wherein the document is called up in a scrolling window. The display format provides ample room for a handwritten note, while allowing the user to scroll through an entire document on a single screen as shown in FIG. 12. Such a function accommodates the need, for example, to send a copy of a document with a brief note attached. Alternately, the user can opt for a mode which spreads the imported document across numerous cards illustrated in FIG. 13 such that there is ample room for multiple handwritten annotations throughout the body of the text. This mode accommodates the need for more thorough editorial treatment throughout the material. An Export button 94 on this module allows the user to export text which has been imported and subsequently modified. The button entitled "Import" 96 provides the mechanism for importing an ASCII text document. A Link button 98 is provided to facilitate the "filing" of a set of Import cards as a single operation. The filing operation will be performed upon all cards for which the link function has been turned on.

The last module of the ScriptBase stack, entitled Letter Pad, (shown in FIG. 14) provides a platform for creating text documents based upon handwritten notes. Similar to the way individuals supplement the use of a word processor by jotting down handwritten notes, this template may be used to guide the composition of typewritten text. Handwritten notes may be entered upon the upper two-thirds of the screen, while text may be typed into a scrolling window on the lower third. The handwritting area may be entirely cleared with a Command-Delete sequence or items may be selectively deleted using the eraser or the graphic selection tools.

The Letter Pad is ideal for taking handwritten notes on a text document as illustrated in FIG. 15. The document may be scrolled in the text window and handwritten notes recorded on the upper portion of the screen. A button, not shown in the prototype, may be activated to copy a screenfull of handwritten notes to a designated file and clear the handwriting area in preparation for additional notes.

"APPOINTMENTS/TO-DO" MODULE

While the ScriptBase module serves as the primary handwriting entry appliance, the "Appointments/To-Do" module illustrated in FIG. 5 represents the focal point for organization of information, particularly when used in a business setting. This tool is modeled after the ubiquitous "appointment book" carried by virtually all business people and other employed professionals. It combines the appointment documentation function with the "to-do" list planning function.

The objects of the "Appointments/To-Do" module are the following: (1) Automate certain of the planning and scheduling operations of the appointment book and "to-do" list functions (updating and allocation of items over time and retrieval and storage of long range calendar items) (2) Function as an information organization and control center for information which supports "to-do" items (creation/retrieval, revision, transmittal, storage—directly from the task item). (3) Dial telephone numbers (through computer and modem) associated with "to-do" list task items. The "to-do" list is used by its creators as a planning vehicle for accomplishing work over a variety of time frames; long range, this month, this week, today. As time proceeds from the long range perspective to the immediate, "to-do" items get allocated into a daily time slot framework.

The "to-do" list thus represents not only the center point for work efforts, but constitutes the heart of one's information processing. In particular, the bulk of this written information commerce proceeds from initiation in the to "to-do" list. This entity is thus the most appropriate focal point for organizing daily information processing. By utilizing a computerized format for the "to-do" list documentation we focus computerization on the heart of our daily written information commerce and proceed downward through subordinate information processing activities. This scheme maximizes the amount of information processing handled with computer assistance and hence maximizes the benefits of computerization.

The computerized "Appointments/To-Do" module closely resembles its manual cousin, thus it allows simultaneous entry of information into a manual appointment book and the computerized version. This is possible with most digitizing tablet technologies. Thus the user can record entries into a manual appointment book and the computerized counterpart without dual effort. Upon program start up, the computer automatically creates new "Appointments/To-Do" pages for all dates between the last page date and the next thirty days (thirty days from the current date). It then returns to the current date. Planning for item beyond the thirty day detailed planning range is accomplished using the Long Range Calendar (illustrated in FIG. 16) which provides a more abbreviated documentation format across 365 days. Handwritten items entered in the Long Range Calendar may be brought into the "Appointments/To-Do" module with computer assistance.

The "Appointments/To-Do" page for Saturday is nominally reserved for documenting weekend information, and that for Sunday for a cumulative listing of "to-do" items to be undertaken the following week as shown in FIG. 4. However, each page follows the conventional format and may be used accordingly. The benefits of this use convention will be further explained under Operation. There are several new operating buttons in this module which are shown in FIGS. 4 and 5. An Update button 100 and a Delete button 102 work in conjunction with the checkboxes 120 for each line of the "to-do" list. Update button 100 operates on handwritten "to-do" items with corresponding checkboxes selected by updating them to a specified date or by default to the next day. Similarly, Delete button 102 removes selected item. These functions operate not only upon handwritten notes but also upon "Sticky-Link" buttons 104 buttons or telephone numbers 106 associated with the "to-do" items. The significant value of such a function can be better appreciated in the context of the scenario described under Operation.

The Update button thus automates the process of allocating "to-do" items and their information support appendages across time. Because jumps into the "Appointments/To-Do" module always bring the user to the current date, a Find button 108 may be used to jump to a specific (non-current) date. If the desired date is more than 30 days beyond the current date, the user can jump to the Long Range Calendar which provides a one year time span. DB represents an acronym for DateBook, another name for the Long Range Calendar.

DB button 110 jumps the user to the Long Range Calendar. Xpand button 112 performs the simple, but highly important function of introducing a blank note card of the ScriptBase format as the next page of the "Appointments/To-Do" book. This instant scratch pad may be used very expeditiously in prosecution of the days "to-do" items as described under Operation.

SECRETARY MODULE

Figure 11:
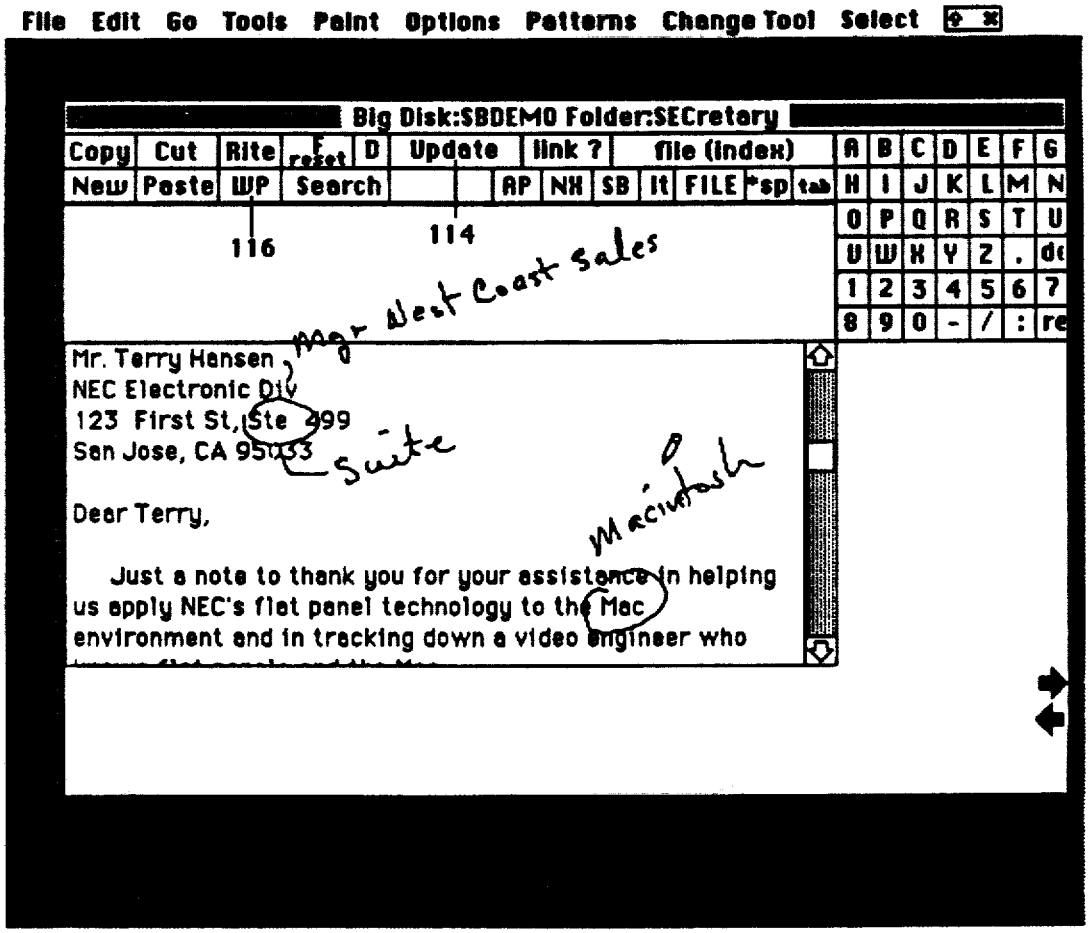
FIG. 11 shows a computer screen displaying a correction card in the Secretary module.

The function of the Secretary module, illustrated in FIG. 9, is to assist in the transformation of handwritten material into typewritten format. A Ltr button 92 on the ScriptBase Note Pad, shown in FIG. 6, is used to transmit (generally over a network) handwritten material from a Note Pad card of the Secretary module which is similar to that of the Letter Pad with minor modifications. The Secretary types the handwritten information into the typing window in a fashion identical to that employed in the Letter Pad. When the typing is complete, the author may access the Secretary module and apply handwritten corrections and/or annotations as shown in FIG. 11. This is accomplished by marking the desired portion of scrolling text which creates a dynamic correction card following the Typing screen. Annotations may then be applied upon the correction card to the portion of text in question. Multiple such cards may be created. To correct the text, the secretary simply makes the corrections in the correction card typing window and touches Update button 114 which updates the original text. Because the Secretary module possesses only rudimentary word processing functions, the secretary may desire to finish the document by exporting it into the computer's primary word processing program by touching WP button 116.

ADDRESS BOOK MODULE

The address book module, illustrated in FIG. 10, represents a piece of code which not only provides traditional address book functions but also functions as a telephone dialer. This module as well as the Long Range Calendar module represent code developed by Apple Computer for distribution with the HyperCard system which was modified for the prototype.

CHECK WRITING MODULE

Figure 17:
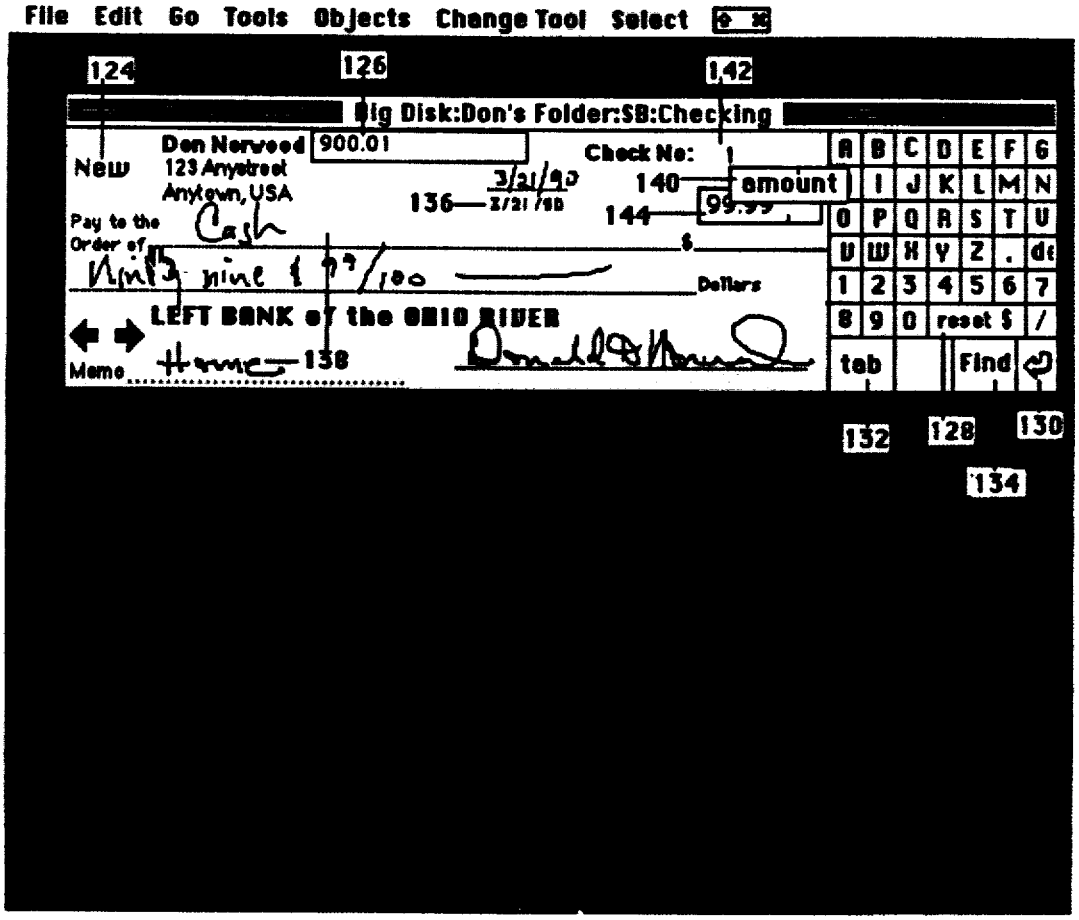
FIG. 17 shows a computer screen displaying a Check Book format used in accordance with the present invention.

FIG. 17 shows a module which enables the user to employ the system for bank checking account documentation. This capability is especially useful when employed with a vest-pocket-sized portable embodiment of the system as described under Alternate Embodiments and Variations. This feature draws upon a capability of digitizing tablet technology which makes it possible to use the pen to write on a piece of paper laid atop the screen while simultaneously writing into the computer. A blank check may be placed on the screen tablet surface, aligned with the corresponding check image as shown in FIG. 17, fixed in place by any of a variety of means, and handwritten. The button keys or character recognition software may be employed to enter digital numbers into the amount field.

The following operating buttons and numeric fields are provided. A New button 124 creates a new computer check image displaying a sequential check number in a numeric field 142. An amount button 140, (shown offset in FIG. 17 to reveal the underlying Amount field 144) allows the user to enter digital numbers by means of the button keys into the Amount field 144 (which is revealed when the Amount button is pushed). The Amount button also causes the current date to be displayed in a Date field 136. A current balance field 126 is also displayed on the computer check. A Find check button 134 is used in conjunction with the Tab button 132 to search for a check of a given date. A reset button 128 resets the amount field to blank and a Return button 130 is used to exit the module.

GENERAL ADVANTAGES OF THE SYSTEM

By allowing virtually all of an individual's written information processing to be computerized, computer benefits such as speed of storage, retrieval, transmission and reliability are extended to a level heretofore not achieved. This also overcomes major disadvantages of prior art which necessitates maintenance of manual files for handwritten items (in addition to computer files) and labor expenditures associated with their retrieval, transmittal, and storage. By allowing elimination of manual files, it promises large savings in labor and physical storage costs. This device also overcomes a key drawback associated with keyboard use which makes short data items (e.g. messages, notes, reminders, etc.) unsuitable for computerization because the data entry burden exceeds the payoff. When installed on a tiny vest-pocket size computer, this system obviates the need for a keyboard. Miniaturized keyboards on such machines have prevented their use for entry of extensive textual information. It thus overcomes a significant drawback of present vest-pocket computers and expands their utility to enter larger volumes of textual data such as meeting notes, appointments, reminders, etc. which may be subsequently downloaded to a fixed computer. This represents a major extension of computer benefits into a heretofore untapped arena.

Coupled to these extensions of applications are substantial quality benefits. These include instantaneous storage and retrieval, reduction of "lost" information (a drawback of paper systems), and a significant reduction in the learning requirements (a drawback of keyboard systems). A user need learn almost nothing to be able to enter, store, retrieve and transmit information. The elimination of the keyboard entry barrier promotes the entry of whole new classes of potential users. Accordingly, computerization benefits are extended to a broader population. Another advantage derives from the capability for writing with an ink-filled stylus onto a piece of paper and into the computer at the same time. Further advantage of this copy feature relates to the frequent need for a copy of a "signed" document. Handwritten entry overcomes character set dependence, another disadvantage of keyboard based computers. It also offers the ability to draw pictures, a communication advantage not generally available from keyboard dependent systems.

The experimental scenario described under Operation showed labor time savings in the order of 30 percent and throughput improvement of 100 percent. Cost savings from reduction in paper use and elimination of physical file storage needs can be very significant. The system eliminates the need for making paper copies of documents which are to receive handwritten annotations such as draft versions or editorial commentary. Paper usage for forms incorporating hand-entered data along with multiple associated copies may also be eliminated. In summary, the advantages of the present system include significant cost reductions, productivity and quality gains. Furthermore, it offers the potential for extensive expansion of the benefits of computerization to broad new applications and large classes of non-users.

It may be noted that the extent of benefits which result from such a comprehensive system were not expected for a number of reasons. (1) Prior to the recent advent of a coincident display and writing interface, handwriting entry suffered from hand-to-eye coordination difficulties caused by the separation of the writing surface and the location in which the writing was observed (the display). (2) Lower resolution screens made handwriting difficult to read. (3) A wide-spread misconception appeared to exist which suggested that only data which was digitized could be usefully manipulated in a computer. (4) The magnitude of potential computer benefits available through assumption by the computer of the large bulk of an individual's handwritten information commerce had not been calculated or appreciated. It thus represents an unexpected result. This may be due, in part, to the fact that handwriting is generally considered more laborious than typing. The time-saving and throughput benefits of such a hybrid system cumulate to assume significant amounts, in particular, because of the synergistic effects of the system which can handle virtually any type of handwritten or keyboard-entered information processing; a result of the "system" nature of the device. For example, an "to-do" note which represents an uncompleted work item can instantly be moved to the next day but may retain linkages to supporting information files. Thus the unexpected liaison between hypertext type programming appliances and handwriting has significantly increased the computing benefits. Because of its breadth, the comprehensive hybrid system serves as the user's primary interface. As such, the naturalness of the pen and pad interface overcomes a long felt need for computer interface improvement.

SPECIFIC ADVANTAGES OF THE SYSTEM

Numerous advantages derive from specific features of the system as programmed which are detailed under Operation. Among other things, such features include: the ability to automatically move (e.g. update) handwritten appointment notes or "to-do" list items; hypertext features which attach to handwritten notes which travel with these notes wherever they go; jump out and pop return capabilities to allow instantaneous context interruptions for performance of alternate functions; handwritten annotation of both text and other handwriting; automatic creation of file indexes; automatic recall of handwritten reminders; complete secretarial functions; and a combined text and handwriting facility which allows a user to a) take handwritten notes while scrolling through a text document, or b) set down and organize handwritten notes which can be used to guide the typing of a textual document, much as one would make notes on a scratch pad preliminary to typing up a document.

Two features with special importance are "Sticky-link" buttons and telephone number dialer buttons. Sticky-link buttons represent software buttons which can be created on the fly by the user to link information stored in different files. By "pushing" a sticky-link button, the user can jump from the file which incorporates the button to the file which represents the link target. The user may thus instantly access subordinate information structures which are physically disconnected but informationally related. The truly nice feature of these link buttons is that they travel with the informational element of which they are a part. Thus, if a copy of an information item which embodies a link button is transmitted, the receiver inherits the link button capability. This concept of traveling operational buttons is further exemplified in a feature which allows the user to embed phone numbers as buttons in an informational element. By "clicking" the pen button on the phone number, the computer can actually dial the party whose number is embedded in the button through a modem attached to the computer. These buttons are also created on the fly by the user and travel with their host information. The "to do" list portion of the appointment book allows automatic updating of handwritten notes and accompanying sticky links and/or phone number buttons without the normal cut and paste rigmarole.

OPERATION

The operation of this system is best described by relating a typical use scenario. Unless otherwise noted, the subject information is handwritten. On a given day, the first time a user starts the program, a screen dialogue box asks if the computer should check for Reminder notes associated with a date equal to the current data. A "yes" response results in the display of a handwritten note reminding the user of an important birthday two weeks hence, along with some gift ideas.

LONG-RANGE CALENDAR

After all outstanding reminders have been displayed, the computer inquires if the user would next like to view the Long-Range Calendar, illustrated in FIG. 16. This appliance represents an extension (abbreviated in detail) of the user's computerized appointment book across an entire year. It provides a place for recording appointments or other important time dependent information which are more than 30 days future from the current date. Assuming again a "yes" response, the user may jump to the card displaying long-range calendar information for the current week as shown in FIG. 16. If desired, the user can easily move information pertinent to the current day's activities for pasting onto the current day's activity schedule in the "Appointments/-To-Do" module.

WEEKLY TASK PLANNING

Touching AP jump button 118 in the margin takes the user, instantly, to the current day in the "Appointments/To-Do" module, as shown in FIG. 5. Assume that it's Monday and that the first order of business is to plan the week's activities. As illustrated in FIG. 4, the user can list things to do on the left side, then allocate them to various days of the week (or any date). By checking (touching) box 120 (shown in FIG. 4) to the left of the handwritten item, then touching Update 100, the user may indicate the date (or day of the week) to which the item should be posted. Mechanically, the sequence unfolds as follows: the Update button turns into a field; a date or day of the week is entered by touching the appropriate button keys; and the tab button key is touched to lock the field and carry out movement of the handwritten graphics to the target date. The user is assisted by a help message appearing at the bottom of the screen. The sequence is, of course, carried out much more quickly than corresponding manual operations. Items not completed on the target day can be moved forward to the next day almost instantaneously with two quick touches.

INFORMATION PROCESSING FOR A TYPICAL WORK ITEM

Incorporating a Telephone Number into the Work Item

FIG. 5 shows that two items "to contact Terry Hansen of NEC" and "make reservations for Comdex" have been allocated to Monday's list of things to do. To begin work on the first item, the user touches Tel-Assist button 74. It opens into a field, and at the same time inquires (through a dialogue box) whether the user wishes to enter the telephone number directly or get it from the address book. Using the same methodology as with the Update button, the user may enter the data into the telephone field. (Alternately, the program jumps to the Address Book where the user selects the number.) This time however, clicking the Tab key turns the data field into a moveable button/field (which incorporated the telephone number) and, which the user may drag next to the handwritten entry by using the pen as a mouse. Subsequent touches on the newly created phone number button directs the computer to dial the number through an attached modem. Assume, Mr. Hansen is not in, but it is discovered that he will return at 2 PM. The user can jot a brief reminder next to 2 PM on the appointment side. At 2 PM, we simply touch the number to re-initiate the call.

Recording of Work Item Supporting Information

While waiting for Mr. Hansen's secretary to transfer the call, the user can touch Xpand 112 button to call up a scratch pad as illustrated in FIG. 6 so handwritten notes can be taken during the conversation. As a part of these notes, the user will get Mr. Hansen's address and the phone number of a subordinate contact he suggests. While the address is entered in handwritten form, the user will enter the number digitally using the Tel-Assist button because it's easily done with the button keys and will thus be operational.

Sending a Memo which Includes the Work Item Supporting Information

Figure 7:
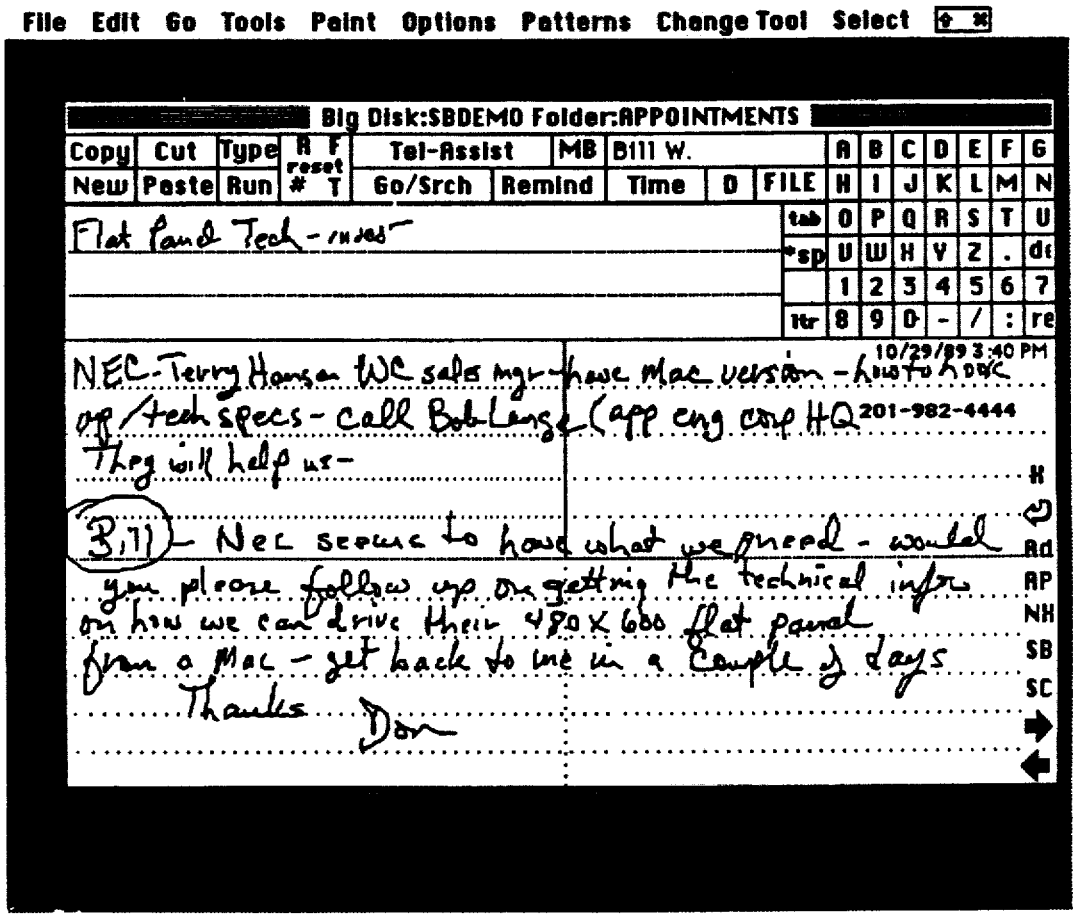
FIG. 7 shows a computer screen displaying handwritten data recorded on a Note Pad card to be transmitted along with a handwritten explanatory note to a colleague.

Finishing the conversation, the user decides to assign a subordinate, Bill W., to pursue this activity. To do this the conventional, manual way, the user would likely get out a memo and laboriously transcribe the collected information (since it is desirable to keep a tickler copy). Or perhaps, it may be easier to walk to the copy machine; make a copy and add a note of explanation. In either case, the process is time consuming and the transit of the memo through the company mail system, not as rapid as one would like. With the present system, the note of explanation can be added at the bottom as shown in FIG. 7 and a copy sent electronically to Bill by touching Copy and then filing the copy to Bills mail box by touching file (index), File, and selecting the Bill W icon from the index. Not only has the user saved a good deal of time and drastically improved information throughput, but he has also conveyed an operational attribute which saves Bill time. He too can dial the enclosed number simply by touching it.

Creation of a Letter

Because this was a rather important contact, the user would like to confirm the substance of the conversation by writing a letter to the individual contacted. Again, it's useful to compare the traditional, manual process with the methodology enabled by this system. A conventional approach for would entail handwriting the letter (or possibly dictating it), and hand delivering or mailing it to the secretary. The latter would type a draft, print it, and mail, or hand deliver it. The author would, in turn, make handwritten corrections and/or changes and return it to the secretary. After final typing, the letter would wend its way again back to the author for signature. A good deal of the labor and almost all of the transit delay is eliminated by being able to transmit handwritten information through the computer as follows.

Figure 8:
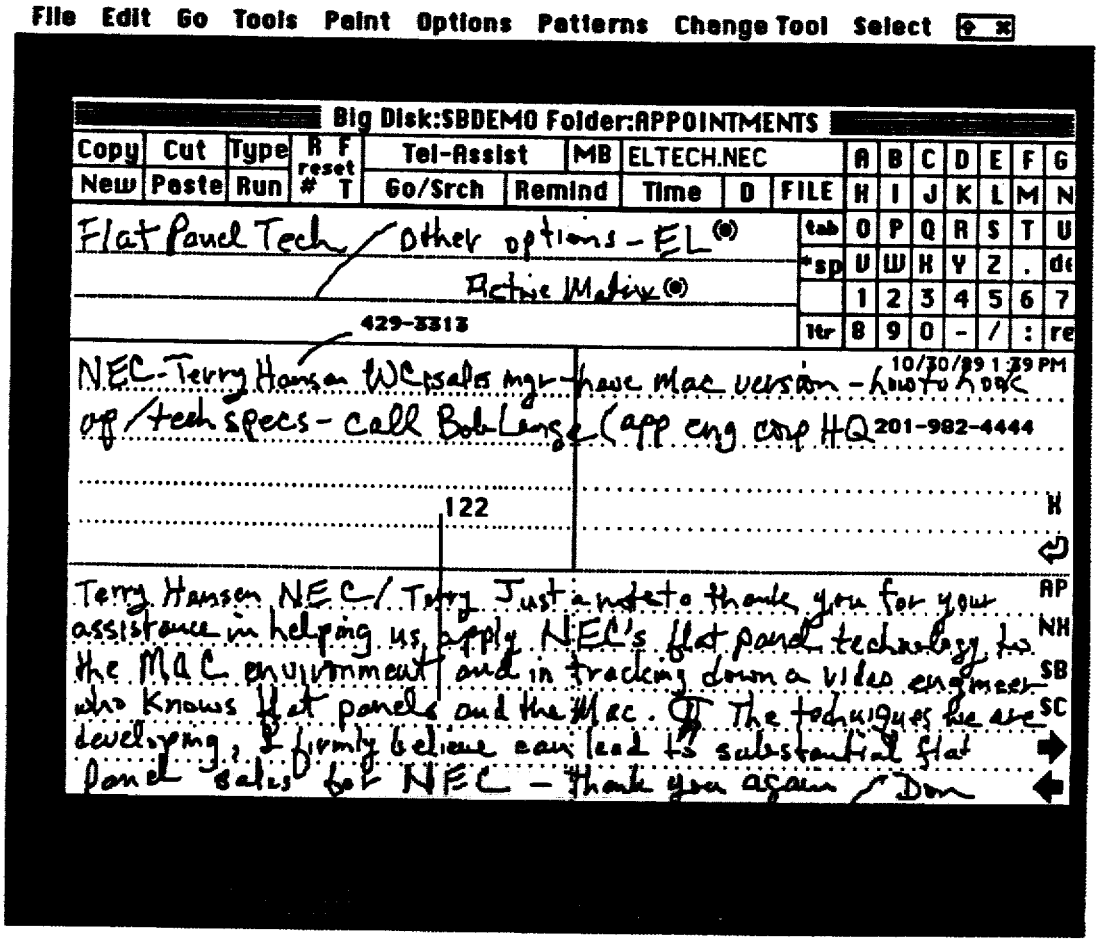
FIG. 8 shows a computer screen displaying a handwritten letter to be transmitted to a typist included on the data card.

Using the bottom one-third of the Note Pad screen as shown in FIG. 8, a user may handwrite material 122 which will be automatically transmitted to the secretary module by touching the Ltr button. Of course, more than one card may be used to transmit longer material. FIG. 9 shows the handwritten material in the Secretary module following transmission. The secretary will type the material into a scrolling typing window shown at the bottom of the screen. To begin, the secretary may access the author's address book as shown in FIG. 10 for the recipients address. Noting that the author had made a handwritten entry, the secretary may formalize it by typing it, then copy and paste the address to the letter in preparation. The digitizing of the address is done only once, and by the secretary as opposed to the user.

Correction of Letter Draft

The author may then access the Secretary screen and make handwritten changes directly on the source document. To do this, the author scrolls through the text to a point where a handwritten annotation is desired. At this point, the visible section of text is first marked by selecting a reference word in the upper left hand corner and touching Return. This makes a copy of the desired text which the author then annotates with handwritten comments as shown in FIG. 11. The secretary will subsequently view the handwritten correction cards; make the indicated typing changes directly on the card; and simply touch the Update button to transfer the changes to the original. The Secretary module possesses only rudimentary word processing capabilities; thus, the secretary may wish to transfer the letter into the regular word processor for finalization by touching the WP button. As another nice feature of this system, it may be noted that given a printer of sufficient resolution, additional time and throughput benefits may be garnered by having the author sign the letter electronically.

Filing Supporting Information, Linking it to the Work Item, and Updating the Work Item Before leaving the "Appointments/To-Do" module, the user would like to file the note documenting this activity and update the appointment book to follow up on task progress in a couple of weeks. The note card illustrated in FIG. 6 may be filed by entering a file name into "file (index)" button/field 86 by touching the file (index) button and then desired button keys) or it may be entered by using File 84 and the index icons. After the data is filed, the user is returned to the current day's appointment page. Touching the MB (Make Button) creates a "Sticky-Link" button 104. After it is created the button is dragged to the "Terry Hansen" entry area and fixed in location by pressing the pen side button twice and clicking on the Tab button key. Then, by touching the check box to the left of the entry, touching Update and supplying a target date via the button keys, the entire entry including the telephone number and Sticky-Link button is moved to the desired date. An option is available, as a part of the updating process to take a quick peek at the target card to confirm that the information being updated will not overlay any existing information on the target card. When using the "to-do" list for that target date, the user need only touch the Sticky Link button to recall the notes and touch the number to re-establish a telephone contact. The time saving potential of this feature for individuals who perform repeated telephone contact work, such as real estate agents do, is significant.

Annotating and Sending a Document

Next, assume that the user would like to send the boss a copy of the letter with a short explanatory note attached. This would normally be handled by making an extra printout or copy, applying a stick-on note and mailing it. With the present system, labor, paper cost, and transit time can be eliminated by using the Import Pad, as shown in FIG. 12. With two button touches ("SB" on the margin of the "Appointments/To-Do" page and then "Import Pad" on the Main Menu), the user jumps to the Import Pad. Assume at this point that the user is interrupted by an overseas phone call. The company's French representative is calling from an airport phone to respond to an urgent and important technical question. His flight leaves in a couple minutes. Under conventional circumstances, the call recipient would likely rummage through papers or try to find the physical file holding the handwritten details of the query, wasting, of course, valuable and expensive time. With the present system the user is able to interrupt current work; jump to the index; then, instantly, to the required material; upon which the answer may be recorded such that it may then be sent electronically to the source of the query. The problem has been solved; and with a single touch on the Return button, the user is back at the Import Pad.

To bring the letter in question on the screen, the user touches the Import button, selects the letter's location (by selection within a dialogue box or by providing a button key entry of the file name); selects its type (text or data); and selects a format (single card scrolling window or multi-card). To the right of the scrolling text window, the user supplies the desired note as shown in FIG. 12, and mails it to the boss simply by touching "file (index)", File and selecting the Bosses' icon on the index. The Letter Pad also accommodates another frequently undertaken information processing activity: that of supplying handwritten annotations in the margin of some textual material which is then filed or transmitted. For example, a user might enter a magazine article into the computer by using a digital scanner; jot a note on the margin; and send it to a colleague. The ease of making one or more copies represents an added benefit.

Annotation Throughout a Document

Figure 13:
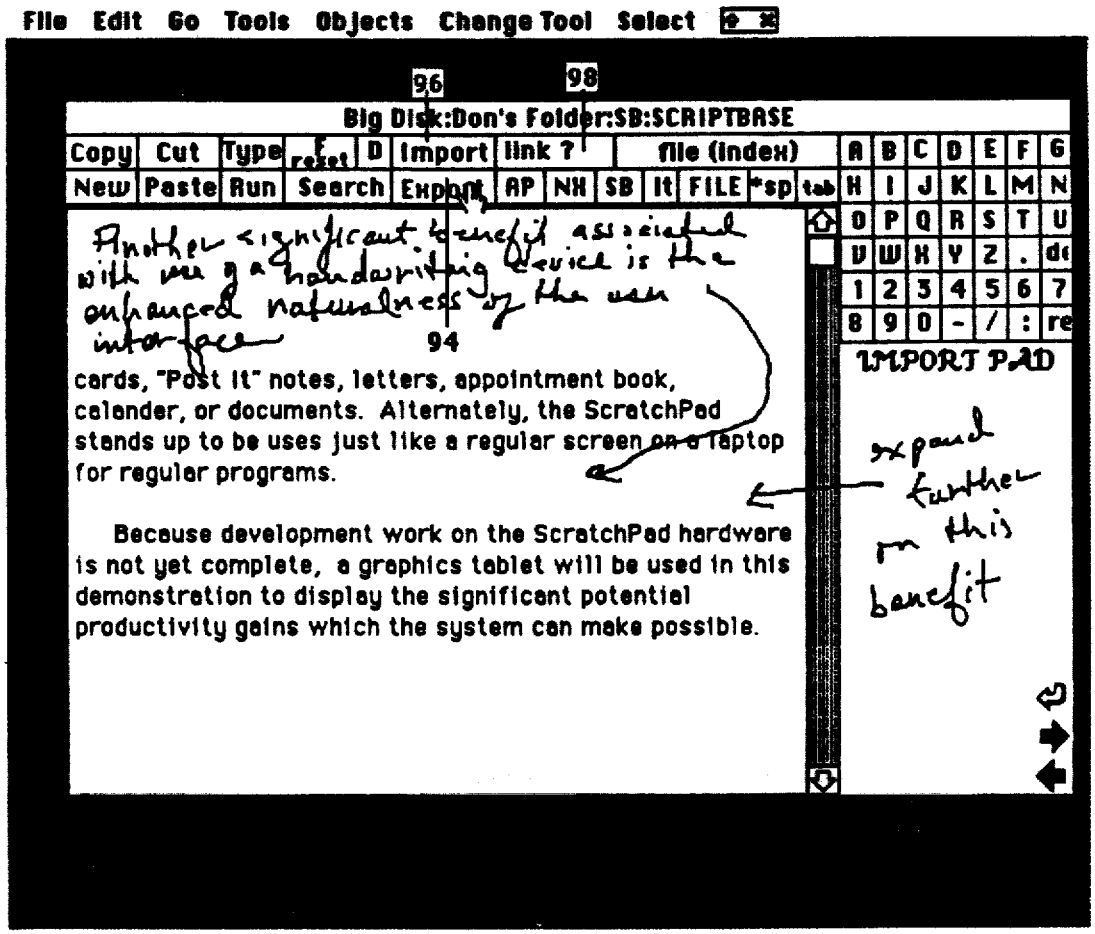
FIG. 13 shows a computer screen displaying a text document displayed in a mode whereby handwritten annotations can be supplied throughout the document.

Another highly cost-beneficial use of the Import Pad arises when it is desired to provide handwritten comments throughout a document. The document may be brought up onto the screen as above, except that the format specification may provide that the document be spread out across multiple cards as illustrated in FIG. 13. This format provides plenty of room for annotations throughout the text as opposed to a note only at the beginning. When this procedure is applied in the circulation of a document to multiple individuals, the magnitude of the time and transit benefits can be readily appreciated. With traditional manual methods, multiple copies of the physical document would have to be made and transmitted, annotated, returned, requiring much greater labor and throughput time.

Creating a Typewritten Document

Another frequently undertaken information processing area deals with the creation of written reports. If a user possesses at least rudimentary typing skill, this does represent an area where the keyboard interface can be of value. The keyboard is however, not usually the only writing instrument involved. It is common to preface the entry of text with handwritten notes on a scratch pad: a list of ideas, topics, numeric annotations indicating order of topic entry, or perhaps even an outline. Another prefatory activity involves the physical collection of source data. Frequently this is gathered from a wide range of sources including scratch pad notes buried somewhere, various file folders, magazine articles or other printed materials, etc. It is instructive to see how this process also can be beneficially accomplished with the present system.

The appliance conceived to perform such a function is named a "Letter Pad". As shown in FIG. 14, the upper two-thirds of the Letter Pad is reserved for handwriting while the bottom one-third features a scrolling typing window. The handwriting portion can be used in a number of ways. As a topic list, entries can be ordered (by moving the graphic entries around) into an outline for typing expansion detail into the window beneath. Alternately, a list of major headings may be copied to successive new cards for further expansion and subsequent typing into their respective windows. The typing in each window can subsequently be combined into a single text. Perhaps the most beneficial use involves writing names of supporting data sources and applying Sticky Link buttons. These buttons, upon touch, instantly call up the supporting data Note Pad cards (such as that shown in FIG. 6) upon which the source data was originally entered. By clicking on the Type button on these source cards, the user may type, from the handwritten notes and directly on the source cards, then move the typewritten material back to the original Letter Pad window. This process represents a truly productive methodology for document production, which avoids the physical handling of multiple manual files and physically disparate data sources.

Taking Notes from a Scrolling Document

Another significant usage suggests that an alternate name for this appliance would be "Read-Write Pad". In this usage, roles are reversed and the "typing" window becomes simply a "reading" window into which any document can be displayed by touching the Import button. The entire text may be read by scrolling the document and handwritten notes taken by the user. When the handwriting area becomes filled, a button may be touched to move the handwritten content to a blank card and clear the area to accommodate more notes. This "note-taking" feature significantly enhances movement towards fully computerizing our information processing.

Banking Check Subsystem

A user may employ the check writing module to reduce the labor associated with this chore and reduce the likelihood of committing arithmetic errors. The check writing module is accessed by selecting the checking icon from the index which brings the user to the stack which contains images of the previously written checks. The number of checks kept in this stack is limited only by system file size constraints.

Upon entry into the stack, the last written check is displayed. An account balance field shows the users current balance. Touching the New button, produces an image of the next sequentially numbered blank check and displays the Amount button. The user touches the Amount button and enters the desired figures by means of the button keys. The Amount button program also supplies the current date to the computer check. Depression of the pen side button stores the amount figure and updates the user's balance field. A blank check may then be placed atop the screen tablet surface, aligned with the corresponding check image as shown in FIG. 17, fixed in place by any of a variety of means and handwritten. The date, payee, script dollar amount, memo, and signature may then be handwritten on the physical check. These are recorded simultaneously into the computer check. Thus, a duplicate image of the actual physical check is archived in the computer. These images may be periodically copied or moved to a floppy disk for long term storage. Of course, the user may easily page back and forth among check written using the arrow buttons.

SUMMARY OF BENEFITS BY MODULE

While the modules ("Appointments/To-Do", Note Pad, Secretary, Import, and Letter Pad) were designed to work in concert to meet the broad spectrum of needs of an individual's commonly-experienced daily written information processing each module represents a significant stand-alone device. A number of benefits of each module are enumerated and/or summarized below.

The "Appointments/To-Do" module provides the ability to organize and carry out work from a list of "to-do" items. This device's capabilities for retrieval and storage of updated files which contain handwritten information offer substantial and easily identifiable labor savings over corresponding manual methods. These savings are further extended by automatic telephone dialing. Savings realized by not having to physically retrieve and restore file folders are often multiplied in situations such as the following: when there are multiple files associated with a single handwritten work item; when multiple telephone calls are made in attempting to reach a desired party; when work items are repeated periodically or simply when a work item is updated for future activity or because it was not completed. Numerous jobs exist (e.g. stock brokers, real estate sales) which require frequent periodic telephone contact and updating of a client's file. Application in such situations would result in very substantial labor savings. In addition, daily calendars (of the type generally carried about with the individual) frequently do not span an entire year and thus entail maintenance of a seperate long range calendar. This requires transposition of items and prevents access to long range information when the user is distant from the yearly calendar. The combination long range and short range calendar of this system overcomes these disadvantages. In addition, entries may be made by a secretary and the users portable version automatically updated.

Extensive labor saving may also be realized through use of the Secretary module as an independent device. Its employment eliminates the following time consuming manual steps: physical transmittal of handwritten source copy; printing of one or more draft copies for editing/correction; return transmittal of the hand edited draft material; and copying of source and final documents for certain purposes. As compared with internal mail systems, electronic transmittal of handwritten source and annotated material results in a dramatic increase in throughput—a significant quality benefit.

The Note Pad module also offers significant benefits as an independent entity. Essentially it represents a vehicle for providing the benefits of computerization to the myriad number of information processing activities which heretofore have been undertaken with pencil and paper because the associated computer keyboard entry labor exceeded the perceived benefits. This application spectrum is also broad and includes incidental notes, reminders, telephone messages, and lists of various types. More substantial items are also embraced such as meeting notes, memos, handwritten materials to be formalized, and handwritten data bases which may be constructed in hierarchical fashion with Sticky-Link buttons linking constituent elements. In addition to the direct labor savings associated with computerization of such applications, substantial quality benefits are present. Instantaneous information retrieval and reduction in lost information are prominent examples. The ability to transmit information along with hypertext features such as Sticky-Link buttons and telephone dialing is also valuable.

There are many occasions when it is desirable to transmit a document with a brief handwritten note attached. More and more documents are being stored in computer format. It is also becoming increasingly easy to read into the computer typewritten documents and periodical material with hand-held and flat-bed scanners. With greatly increasing frequency, such text is being transmitted by computer. It is awkward, somewhat more difficult, and for some (e.g., non-typists), undesirable to append a typewritten note to such documents. The Import module makes this annotation process both less laborious, less difficult, and more natural by allowing transmission of handwritten notes on a document. For example, a magazine article of interest to a colleague may be quickly scanned with a hand scanner, annotated, and sent off in less than a minute. The capability of the Import module system to enable users to make handwritten annotations throughout a document offers very significant labor savings for frequently occurring situations in which documents are circulated for editing and/or comment.

Substantial benefits may also be associated with independent use of the Letter Module. This device possesses two modes of operation. In the "write to type" mode, the user uses handwritten notes committed on one portion of the display as a guide for entering typing material into a typing window. This is especially useful for organizing and typing a document, especially a complex one, or one with multiple data sources. In addition Sticky-Link buttons may be invoked to link handwritten subject outline items to data files of supporting data. As an electronic information organizing tool, use of this device is far less time consuming than retrieval and layout of multiple physical source materials which incorporate handwritten information. Such labor savings are leveraged considerably for intermittent work on complex projects where source materials must be repeatedly retrieved and put away. In its alternate "read to write" mode of operation, the user may read material in the scrolling text window and take handwritten notes on the remaining part of the screen. This provides the benefits of computerization for handwritten notes. Thus a user might access various computer data bases; make notes onto multiple cards; and later organize (manipulate) them into a cohesive whole; which might also be formalized using the "write to type" mode discussed above.

The capabilities of the checkbook module overcomes the following disadvantages of current manual checkbook devices: (1) duplication of labor to create a record of transaction information to a separate check register, or alternately, reliance upon carbonless carbon paper duplicates which are frequently illegible; and (2) likelihood of arithmetic errors associated with manual balance calculation. This capability is especially useful when employed with a vest-pocket-sized portable embodiment of the system as described under Alternate Embodiments and Variations.

Alternate Embodiments and Variations

The system may be configured to run on a portable vest-pocket sized computer as shown in FIG. 1B for entry of handwritten information remote from the users primary computer. Such a device consists of a miniaturized personal computer 28 with a correspondingly small combination display-entry screen 26 similar in function to that described above as the primary entry device. Physically, this ancillary unit looks like a vest-pocket appointment book with dimensions of approximately 16.5 cm by 8.8 cm by 1.3 cm and consists of two sides connected by a seam along one long dimension and folds to the size above, just as does an appointment book. One side 28 of the ancillary unit houses a micro computer such as that currently under development by Chips & Technologies of San Jose, Ca. The opposite facing side 26 provides a screen tablet of size 16.5 cm by 8.8 cm which is used to capture handwritten information and send it to the CPU for storage.

It should be noted that the virtual screen size can be substantially larger. That is, through graphic software the graphic screen can be scrolled up, down, left or right. An input/output port is included such that the information captured remotely may be downloaded by means of a cable 30 to the primary computer to update existing files or create new ones. Alternately, information such as appointments, things to do, may be copied from the primary computer to the portable unit to be retrieved by the user when remote from the primary computer. This development represents a significant advance for portable computing. A substantial amount of the information that an individual would potentially desire to store on their computer, is be gathered at locations remote from the individual's computer. Examples include meeting notes, appointments, ideas, drafts of letters, etc. Heretofore, computers which were small enough to be carried in a coat pocket were not suitable for entry of written information of any substantial volume e.g. meeting notes. This system overcomes this significant drawback.

Many other extensions, variations, and embellishments are possible. A few of these ramifications are discussed below. Under the heading of hardware related variations the following may be envisioned. A touch screen may be built to work with a cordless stylus (pen). A flat panel display can be built which includes electronics to sense the location of the probe (This has been experimentally demonstrated with an electroluminescent panel.) A special area on the screen may be included which accelerates the movement of the cursor and is useful for cross-screen cursor movement. This acceleration feature may also be triggered via a side button on the pen. An obvious variation is the use of the software on a conventional computer using a graphic tablet for input. Such a usage suffers from somewhat of a hand-to-eye coordination problem. Incorpoation of a hand-held digital scanner would be particularly useful with a portable unit for example doing library research. The user could scan in passages from books and combine handwritten note with the textual input. It may be noted that school children who do not type could benefit from use of the system to carry out handwritten homework assignments by being able to erase and manipulate handwritten work. A CD-ROM unit loaded with an encyclopedia could further encourage use of the system by school children.

A somewhat more technical extension envisions multiple interconnected screen tablets which form a large desktop surface perhaps three feet long and two feet wide. This arrangement would allow multiple documents or information appliances to be displayed and worked with in a fashion closely analogous to current manual environments but with the benefits of computerization. Thus, separate document or pages, scratch pad, appointment book, etc may all be displayed simultaneously in a truly electronic desktop. Such an embodiment would be particularly useful for editing multi-page materials.

Numerous variations and improvements in the software may also be anticipated. Prominent among these would be incorporation of the button-keys into a pull-down or tear-off menu format to leave more room on the screen for handwriting or text. Other of the buttons and combination button fields may be candidates for similar treatment. Certain functional buttons may be combined (e.g. file (index) and File). Update buttons may be added to the appointment side of the "Appointments/To-Do" module. In the embodiment currently programmed, it is necessary to manually change from writing mode to browse mode by depressing the pen button in order to click on a button not on the menu bar. This switching could be automated as it is for the menu bar.

Computer assistance for transferring Long Range Calendar items to the "Appointments/To-Do" module may be implemented. Relating to the automatic updating of handwritten items and associated buttons and/or fields, an algorithm may be developed to make sure that if there were graphics or other items in the target area, that the item being moved can be shifted to a clear area to avoid overlaying existing items. As discussed under the heading of "Updating the work item" an option may be selected to allow the user to view the target area to ascertain if the update will overwrite any existing items. The following paragraph presents an example of a possible programming methodology for moving update items to a clear area after exercising the option to check the update target card. The discussion assumes that the relevant material in the microfiche appendix (Computer Program Listings for implementing the functions described) has been comprehended.

To move the source handwriting, buttons, and or fields to a clear target line, the user may select a checkbox having a clear target area. The coordinates of this selected area which are thus appended to the update buffer area "selectCoords" may be moved from the last set to the second set of check box coordinates in the buffer. To move the handwriting, the first set of selectCoords in the buffer is used to drag a rectangle around the source handwriting. Then, a programmed "click" at the first coordinate pair of that set (which are the first and second items of selectCoords) will select the enclosed handwriting. Finally, the captured material may be dragged from the first coordinate pair of the first set (items 1 and 2 of selectCoords) to the first coordinate pair of the second set—the new target (items 5 and 6 of selectCoords). To move a button or field, set the location of the source item to new coordinates where the new x coordinate is the same as the source location (derived with a "get location" command) and the new y coordinate is the first y coordinate of the second set (item 6 of selectCoords) plus 9.

The Tel-Assist button may automatically retrieve an information file associated with the party whose number is being dialed. A live pull-down calendar might be useful for quickly selecting target dates for updating "Appointments/To-Do" item. Especially useful would be scrolling graphics which would allow the user to create handwritten notes of virtually any size on a single card. A zoom feature which could reduce the size of note cards would also be highly useful for organizing and/or manipulating data from multiple cards on the same screen. Character recognition software may also be of value under certain circumstances, although data input rates are not as rapid aa with button keys. Security software may be added to offer selected protection of data. The an obvious extension to the reminder function would involve having the program pull up all reminder notes for dates which have passed as well as those for the current date. This may be done by modifying the code to compare the date on each reminder line with the current date and pull those cards having dates less than or equal to the current date. This would make it easier to examine reminder notes associated with dates in which the system was not used.

Finally, incorporation of a number of additional software modules (applications) can be very productive. Inclusion of these functions would encourage use of the system by a wider population. A project management module which, of course, featured handwritten input, would be very valuable, particularly for managers and executives (a class known to be not skilled in keyboard entry). An offshoot of the project management module which would be of interest to the public at large would involve personal goal management. Similarly, addition of a spreadsheet module would extend the system's utility to more users. This is an addition which is particularly sympathetic with the hardware. Numbers may be enter into spreadsheet cells less laboriously with the screen tablet hardware than with conventional alternates because selection of the target cell and entry of a number may be combined into a single operation. Keyboards and mice require two separate operations. Character recognition software may be employed for number entry or a miniature button-key number pad may be popped up next to the target cell. Use of the graphic manipulation capabilities of the system for writing and revising handwritten letters has not been mentioned but is obviously possible. Also, employment of the system for telephone messages, perhaps with a special card format is anticipated to be a high volume usage. An Expenses record keeping format would be useful, particularly for the portable embodiment. An obvious extension to the check writing module would be a check register to display the following check information: check (or deposit) number, date, payee and memo, and amount. Additionally, character recognition software may be used to digitize the handwritten entry of the check dollar amount in the numeric dollar field. This would obviate the need to enter this number with the button keys into the computer check image. An algorithm to smooth handwritten characters may also be employed to improve the ease with which it is read, particularly on displays of lower resolution.

SUMMARY, RAMIFICATIONS, AND SCOPE

Accordingly, the reader will see that I have provided a system which works with a screen tablet and a computer to provide a mechanism for easy entry of handwritten information into the computer. In this way the benefits of computing become available to (1) individuals who do not wish to use a keyboard to enter data, and (2) for applications in which the drawbacks of keyboard usage exceed the payoff. Benefits of computerization include great enhancement in the speed and reliability with which a user's information can be retrieved, stored, transmitted and manipulated as well as very significant reductions in labor associated with such information processing activities. It allows elimination of a large proportion of a user's manual files promising lower physical file storage costs. Because handwritten annotation or entries may be applied to computerized documents, the need for paper document objects is greatly reduced resulting not only in cost savings, but also in a reduction in usage of a scarce national resource.

Such a system can extend the benefits of computing, not only to large numbers of new users, but also to broad classes of new uses. Its comprehensive scope brings the benefits of computerized assistance to virtually all of an individual's commonly encountered information processing needs. This system also expands the applicability of portable computing to heretofore untapped areas. Specifically, incorporation of such a handwriting information management system into miniaturized portable computers overcomes the limitations of keyboard entry which seriously limits the rate at which data can be entered and hence their usefulness. Computerization of high frequency information processing activities which have heretofore proved resistant to automation, such as taking notes a meeting, now become possible. Finally, the naturalness of the pen and pad interface reflects an important improvement in the man-machine interface. In summary, the advantages of the present system include significant cost reductions, productivity and quality gains.

While the above description contains many specificities, these should not be construed as limitations on the invention, but rather as exemplification of preferred embodiments thereof. Many other variations are possible. Accordingly, the scope of the invention should be determined not by the embodiments described, but by the appended claims and their legal equivalents.

I claim:

1. A computer information system for handwriting and text, comprising:

a) a computer including a non-volatile storage area and a display;

b) means, including a digitizing pen for indicating positional coordinate information of said pen as an image on said display when said pen is moved, and for initiating a plurality of commands to said computer based upon the position of said image on said display;

c) means for entering digital information into said computer;

d) means for entering handwritten and text information into said storage area and displaying said information on said display;

e) means for creating, in said storage area, handwriting files which accept handwritten information as well as text [and which can be calendar-sequenced upon user direction, and can have date indicia and positional format areas, said date indicia and said positional format areas being in a calendar format];

f) means for manipulating said handwritten and text information within and between said handwriting files in a plurality of different ways in accordance with said respective plurality of commands;

g) means for indexing, storing, retrieving, copying and deleting said handwriting files in said computer;

h) means for creating a program object image on said display, said program object image representing a visual element of a programming system, which is created by a command to said programming system, which appears as an image on said display, which possesses one of a plurality of programmer-controllable physical shapes or sizes, including that of a button object image, which can be moved to any location on said display, which can have program commands associated with it such that a program associated with said program object image can be activated by a user to perform specific program actions;

an improvement comprising:

i) means for allowing said user (1) to create, and place one or more of said program object images on an image of one of said handwriting files on said display, and (2) to associated one or more of said program object images with any specific section of said handwritten information; whereby labor savings or other beneficial actions produced by said user's activation of said program object image associated with said specified handwritten information can be derived repeatedly without repeated creation of said program object image or the commands that it automates;

j) means which can be activated by said user to move as a group only said specific sections of handwritten information and some or all of said program object images associated with said specified section of handwritten information to a specific location within or across said handwriting files which accept handwriting, such that the associations between said specific section of handwritten information and said program object images are preserved; whereby the substantial labor to recreate said linkages can be eliminated which otherwise would be necessary for said user to derive the benefit of said associations in another file location or in a different file; and k) means for identifying precisely said specific section of handwritten information which may be carried out by one of a plurality of techniques, including encirclement of the desired material by the user with a line drawing cursor.

2. The system of claim [1] *22*, further including a means for uploading and downloading information between a portable computer and a non-portable computer.

3. The system of claim [1] *22*, further including means for jumping from [one of the following:] said handwriting file [and said calendar-sequenced file,] to another of the following: said handwriting files [and said calendar-sequenced files] for temporary processing, then returning to the departure position of said one file.

4. The system of claim [1] *22*, further including a graphic index of said handwriting files [and said calendar-sequenced files], said index being composed of elements which, when cursor selected, retrieve an associated file.

5. The system of claim [4] *1* further including means which can be activated by a single user command for moving multiple selected specified sections of said handwritten information and their respective associated program object images to a specific location within or across said handwriting files, such that the associations between said specific section of handwritten information and said respective program object images are preserved; whereby the substantial labor needed to recreate the multiple associations between numerous specified sections of handwritten information and their respective associated program objects may be eliminated.

6. The system of claim [4] *1* wherein said association of said specific section of handwritten information and said program object image is carried out by one of a plurality of programming techniques, including physical placement by said user of said program object image adjacent to said specific section of handwritten information; said physical placement being carried our by one of a plurality of known means, including acquiring said programming object image with the cursor-positioning device, dragging said program object image to the desired location and releasing it there.

7. The system of claim [4] *1* wherein said program object image appears as a button which can have program commands associated with it such that a program associated with said button can be activated by the user to perform specific program actions.

8. The system of claim [4] *1* wherein the activation of said programming object image is carried out by said user placing the cursor on said program object image and pressing a button on the cursor positioning device.

9. The system of claim [4] *1* wherein said program object image associated with said specific section of handwritten information appears as a button (104 in FIG. 5) which, when activated by said user retrieves a file, whereby a user can associate, with said specific section of handwritten information, a button which when activated retrieves a computer file containing information which can be handwritten or textual or both and which is related to the associated handwritten notation.

10. The system of claim [4] *1* wherein said means which can be activated by said user to move a plurality of said specific sections of handwritten information and any subset of said program object images respectively associated with said specific sections of handwritten information to specific locations within or across said [regular or calendar-sequenced] files which accept handwriting is further arranged to optionally modify the relative positioning at the target location of the items being moved upon command of said user; whereby said user can update handwritten notes and their associated benefit-producing buttons without fear of obliterating notes and objects on said target material.

11. The system of claim [4] *1*, further including a graphic index of said handwriting files [and said calendar-sequenced files], said index being composed of elements which, when cursor selected, retrieve an associated file.

12. The system of claim [4] *1*, further including means for uploading and downloading information from said computer to another computer.

13. The system of claim [4] *1*, further including means for jumping from one of [the following:] said handwriting file [and said calendar-sequenced file] to another of [the following:] said handwriting files [and said calendar-sequenced files] for temporary processing, then returning to the departure position of said one file.

14. The system of claim [4] *1*, further including means for associating a date with said handwriting files such that said file is automatically retrieved when said dates become contemporaneous or later than the current date.

15. The system of claim [4] *1*, further including means for linking a plurality of records containing handwriting in said handwriting files such that said plurality of records may be filed as single record in said handwriting files in said computer.

16. The system of claim [4] *1*, further including means for executing a program external to said system without quitting said system.

17. The system of claim [4] *1*, further including means for automatically placing current time and date information into one of said handwriting files.

18. The system of claim [4] *1*, further including means for searching through a plurality of said handwriting files to retrieve one of said handwriting files having a piece of embedded text identical to a sought-after search text.

19. The system of claim [4] *1*, wherein said means for identifying precisely said specific section of handwritten information is arranged to select all handwriting in a predefined fixed area on a particular file screen format which displays the handwriting. (FIG. 5).

20. The system of claim [4] *1*, wherein said program object image further combines the data entry and storage characteristics of a programming language field element which can accept user supplied data entered by a plurality of means including selection of letters and numbers from a set of alphanumeric images displayed on the screen, and which also evidences the action-triggering characteristics of a button object and which can further be characterized as a field-button; whereby activation of said program object image by said user performs a beneficial action which relies upon the user-supplied information provided to said program object image.

21. The system of claim 20, wherein said program object image is arranged to dial a telephone number supplied to the field-button object by said user when said computer is connected to a modem, whereby said user can associated with said specific section of handwritten information a field-button [(105 in FIG. 5)] which when clicked on by said user can cause the number which has been entered into the field-button to be dialed.

22. In a computer information system for handwriting and text, comprising:

a) a computer including a non-volatile storage area and a display;

b) means, including a digitizing pen for indicating positional coordinate information of said pen as an image on said display when said pen is moved, and for initiating a plurality of commands to said computer based upon the position of said image on said display;

c) means for entering digital information into said computer;

d) means for entering handwritten and text information into said storage area and displaying said information on said display;

e) means for creating in said storage area, handwriting files which accept handwritten information as well as text;

f) means for manipulating said handwritten and text information within and between said files in a plurality of different ways in accordance with said respective plurality of commands; and g) means for indexing, storing, retrieving, copying and deleting said files which accept handwritten information as well as and text in said computer; and h) a keyboard and means for typing into one of said handwriting files;

the improvement comprising:

i) means for creating files which accept handwriting and text and which display a two-part format, one part comprising an area for handwriting, the other a scrolling text window which accepts information entered by means of said keyboard or displays previously created text, whereby a user can (1) handwrite notes in said handwriting area and (2) view text displayed in said scrolling text window; and j) means for editing text in said text window with a plurality of commands, including at least cut, copy, paste, and wordwrap function commands.

* * * * *